United States Patent
Hashimoto et al.

(10) Patent No.: US 8,726,733 B2
(45) Date of Patent: May 20, 2014

(54) ULTRASONIC MEASURING METHOD AND ULTRASONIC MEASURING APPARATUS

(75) Inventors: Masahiko Hashimoto, Osaka (JP); Yong Wang, Hyogo (JP)

(73) Assignee: Panasonic Corporation, Osaka (JP)

( * ) Notice: Subject to any disclaimer, the term of this patent is extended or adjusted under 35 U.S.C. 154(b) by 478 days.

(21) Appl. No.: 13/220,748

(22) Filed: Aug. 30, 2011

(65) Prior Publication Data
US 2012/0055250 A1 Mar. 8, 2012

Related U.S. Application Data

(63) Continuation of application No. PCT/JP2011/000871, filed on Feb. 17, 2011.

(30) Foreign Application Priority Data

Feb. 18, 2010 (JP) ................................. 2010-033112

(51) Int. Cl.
*G01N 29/07* (2006.01)
*G06F 19/00* (2011.01)

(52) U.S. Cl.
USPC .................. 73/597; 73/602; 702/56; 702/159

(58) Field of Classification Search
USPC .............. 73/597, 600, 602, 610, 628; 702/56, 702/159
See application file for complete search history.

(56) References Cited

U.S. PATENT DOCUMENTS 5,461,921 A * 10/1995 Papadakis et al. .............. 73/628
5,471,449 A * 11/1995 Kaneko et al. ............. 369/53.17
7,617,731 B2 * 11/2009 Suginouchi et al. ............ 73/602
8,090,547 B2 * 1/2012 Suginouchi et al. ............ 702/56
8,421,479 B2 * 4/2013 Stein .............................. 324/642
2008/0043574 A1 2/2008 Rooney, III et al.
(Continued)

FOREIGN PATENT DOCUMENTS

JP 7-151859 A 6/1995
JP 2004-108826 A 4/2004
(Continued)

OTHER PUBLICATIONS

International Search Report for corresponding International Application No. PCT/JP2011/000871 mailed Mar. 29, 2011.
(Continued)

*Primary Examiner* — J M Saint Surin
(74) *Attorney, Agent, or Firm* — Renner, Otto, Boisselle & Sklar, LLP

(57) ABSTRACT

An ultrasonic measuring method includes: (A) receiving a coded spread spectrum ultrasonic signal in at least two receivers, and generating at least two received signals; (B) performing an quadrature detection on the received signals using the carrier frequency, and producing I and Q components of the received signals; (C) performing phase difference processing on the I and Q components with a coding period synchronized with that of the carrier frequency, and obtaining I' and Q' components from which a phase shift caused by a Doppler shift has been canceled; (D) despreading the I' and Q' components signals using different codes at time intervals synchronized with the carrier frequency, and obtaining despread I" and Q" components; (E) computing the amplitude and phase information based on the I" and Q" components; and (F) calculating the propagation distance and/or orientation of the ultrasonic wave based on the amplitude and phase information.

10 Claims, 14 Drawing Sheets

(56) References Cited

U.S. PATENT DOCUMENTS

| | | |
|---|---|---|
| 2009/0135672 A1 | 5/2009 | Matsuura et al. |
| 2009/0145232 A1* | 6/2009 | Suginouchi et al. ............ 73/597 |
| 2010/0049452 A1* | 2/2010 | Suginouchi et al. ............ 702/56 |

FOREIGN PATENT DOCUMENTS

| | | |
|---|---|---|
| JP | 2006-279173 A | 10/2005 |
| JP | 2005-321359 A | 11/2005 |
| JP | 2007-202088 A | 8/2007 |
| JP | 2009-512857 A | 3/2009 |

OTHER PUBLICATIONS

Asada et al., "Progress in the Long-term Seafloor Geodesy on the Kumano Trough", Journal of Geography, 110 (4), pp. 529-543 (2001) with English Abstract and concise explanation.

\* cited by examiner

OUTPUT TO DISTANCE/ORIENTATION ESTIMATING SECTION

FIG.12
(a)
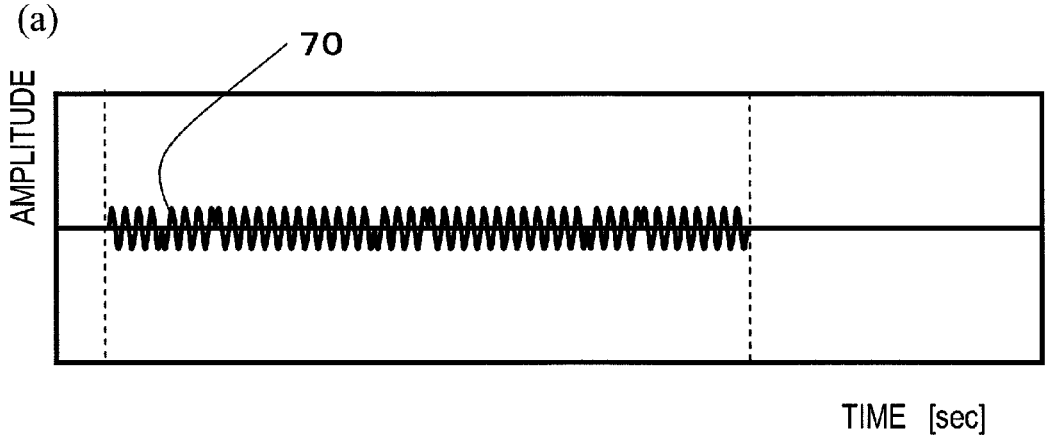
(b)
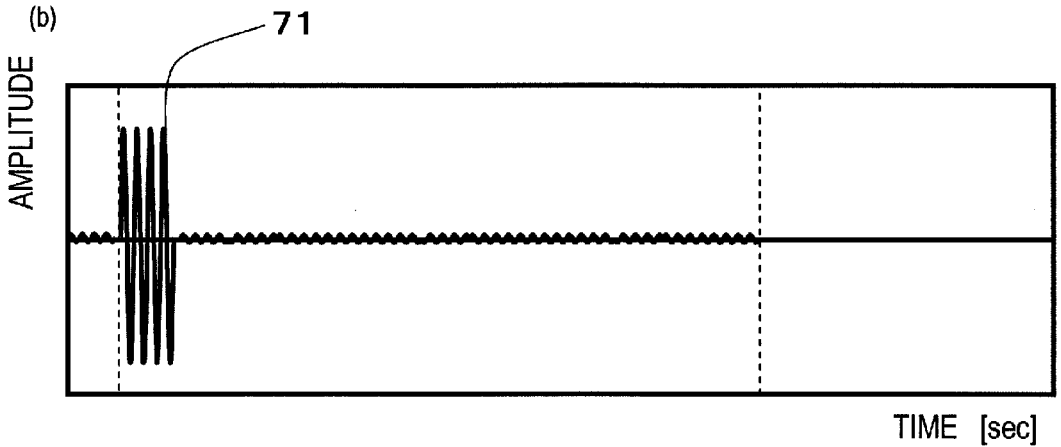
(c)
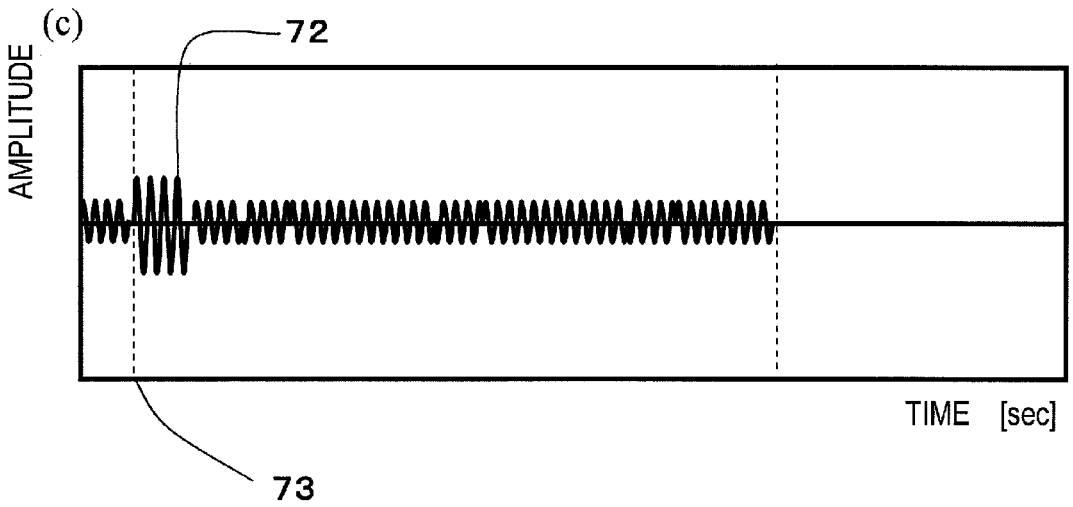

FIG.14
(a) 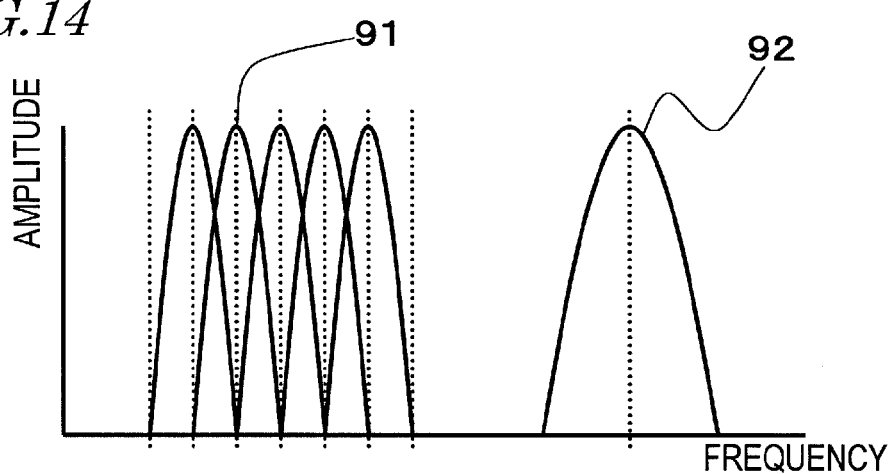
(b) 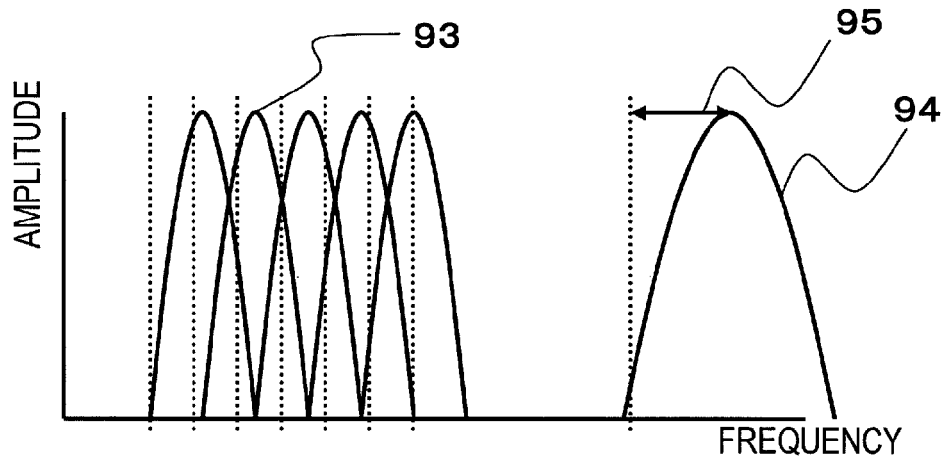
(c) 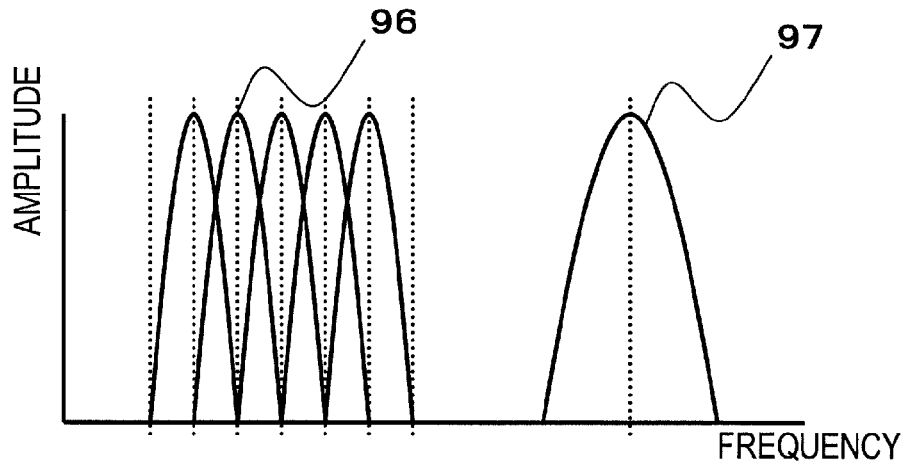

ULTRASONIC MEASURING METHOD AND ULTRASONIC MEASURING APPARATUS

This is a continuation of International Application No. PCT/JP2011/000871, with an international filing date of Feb. 17, 2011, which claims priority of Japanese Patent Application No. 2010-033112, filed on Feb. 18, 2010, the contents of which are hereby incorporated by reference.

BACKGROUND OF THE INVENTION

1. Field of the Invention

The present invention relates to a method and apparatus for ultrasonic measuring. More particularly, the present invention relates to a measuring method and apparatus that can accurately estimate the propagation distance or propagation direction of an ultrasonic wave by using a spread spectrum coded ultrasonic wave even when there is a relative velocity between the object of measurement and the measuring apparatus.

2. Description of the Related Art

An ultrasonic measuring apparatus includes a transmitter to send out an ultrasonic wave and a receiver to receive the ultrasonic wave and estimates the distance between the transmitter and the receiver by the amount of time it has passed since the transmitter sent out the ultrasonic wave and until the receiver receives the ultrasonic wave. Alternatively, another ultrasonic measuring apparatus may estimate the distance between an object and the ultrasonic measuring apparatus itself by the amount of time it has taken for an ultrasonic wave, sent out from the transmitter, to reach the object, get reflected by the object and then get received at the receiver.

In an environment where there are a number of such ultrasonic measuring apparatuses, the ultrasonic waves transmitted simultaneously by the respective ultrasonic measuring apparatuses would interfere with each other, thus possibly causing measurement errors. To avoid such a situation, somebody proposed a method for distinguishing the ultrasonic waves from each other by coding the ultrasonic waves, generated by the respective ultrasonic measuring apparatuses, with mutually different codes.

A conventional ultrasonic measuring apparatus that adopts that coding method is disclosed in Japanese Patent Application Laid-Open Publication No. 2004-108826, for example. FIG. 11 is a block diagram showing the conventional ultrasonic measuring apparatus disclosed in Japanese Patent Application Laid-Open Publication No. 2004-108826. Hereinafter, the basic operation of this conventional ultrasonic measuring apparatus 101 will be described. The ultrasonic measuring apparatus 101 includes a transmitter 8, a receiver 9, a correlator 103, a peak detector 104 and a pulse generator 105.

The pulse generator 105 generates a drive signal for the transmitter 8, which sends out an ultrasonic signal into the space. The ultrasonic signal transmitted passes through an ultrasonic wave propagation path 7 to reach an object 3 and get reflected by the object 3. The ultrasonic signal reflected passes through the ultrasonic wave propagation path 7 again to reach the receiver 9. The drive signals are coded with mutually different codes by respective ultrasonic measuring apparatuses so as to be identified from each other even when the ultrasonic signals sent out by those apparatuses interfere with each other. Considering such a situation where a desired signal should be decrypted and extracted from a number of signals interfering with each other, the other signals are preferably quite dissimilar from the desired one. Random signals that are generated artificially under a predetermined rule so as to have such a characteristic are called "pseudo random signals".

Digital signals represented as a combination of "1" and "0" or "1" and "−1" are often used as the pseudo random signals because digital signals are easy to process. Examples of known digital pseudo random signals include an M-sequence, a Barker sequence and a Golay sequence. Among other things, the M-sequence functions as a code for use in a telecommunications system that adopts the spread spectrum technology. That is to say, the M-sequence is no different from noise with respect to the information to be transmitted but can function as an identifiable carrier when subjected to correlation processing using pulse compression. One of two different M-sequences looks nothing but noise for the other. That is why it is very effective to extract its own signal. Also, even if there are two identical M-sequences, one of the two also looks nothing but noise for the other when there is even a slight time lag between them. As a result, by coding the transmitted signal with the M-sequence pseudo random signal, a desired received signal can be extracted from a time series of received signals that interfere with each other and the time of its reception can be determined.

The drive signal generated by the pulse generator 105 is a spread spectrum (M-sequence discrete) random wave. Japanese Patent Application Laid-Open Publication No. 2004-108826 realizes a pseudo random signal with such a characteristic by binary frequency shift keying in which the frequency associated with bit one and the frequency associated with bit zero are different from each other.

The ultrasonic wave that has left the transmitter 8, passed through the ultrasonic wave propagation path 7 and then reached the receiver 9 has its correlation with the pseudo random signal, generated by the pulse generator 105, examined by the correlator 103. The peak detector 104 detects the peak of the correlation value. The time when the correlation value reaches its peak represents the time when the ultrasonic wave, sent out from the transmitter 8, reaches the receiver 9. And the interval between the time when the ultrasonic wave was transmitted and the time when the correlation value reaches its peak represents the propagation time of the ultrasonic wave to the object 3. Consequently, the distance from the ultrasonic measuring apparatus 101 to the object 3 can be measured by the propagation velocity of the ultrasonic wave.

The (M-sequence discrete) spread spectrum pseudo random signals are unique signals for respective ultrasonic measuring apparatuses. That is why even if an ultrasonic wave that has been sent out from another ultrasonic measuring apparatus reaches the receiver 9, its correlation with the pseudo random signal generated by the pulse generator 105 is very little. Consequently, no peak is detected by the correlator 103 and the ultrasonic measuring apparatus 101 can identify a pseudo random signal that has come from another ultrasonic measuring apparatus.

As described above, between M-sequences, signals other than the desired one look nothing but noise, and therefore, there is very little correlation with the received signal of an ultrasonic wave that was sent out from another ultrasonic measuring apparatus. That is why no peak of the correlation value is detected, and the pseudo random signal obtained from another ultrasonic measuring apparatus can be identified.

However, if such an ultrasonic measuring apparatus that uses the M-sequence coding, for example, is built in a moving body such as a self-moving robot or if a surrounding object is moving to the contrary, then there is a non-zero relative velocity between the surrounding object and the ultrasonic measuring apparatus. And if that relative velocity produces a Doppler shift, then a time lag will be caused between a correlation reference signal and the received signal during the correlation processing, thus decreasing significantly the M sequence's own correlation gain. FIG. 12 illustrates how that decrease in gain is caused. Specifically, FIG. 12(a) illustrates an M-sequence coded received signal 70. If there is no Doppler shift (i.e., if there is a zero relative velocity between the transmitter and the receiver), a despread waveform 71 such as the one shown in FIG. 12(b) is obtained as a result of the correlation processing. In the situation shown in FIG. 12(b), there is an outstanding peak of correlation at the time of reception 73 but the correlation noise in the ranges before and after the peak are so suppressed that a large SNR can be achieved. If a Doppler shift is produced, however, the peak of correlation will decrease significantly and the correlation noise in the ranges before and after the peak will also have raised levels. As a result, the SNR will drop steeply.

A method for compensating for such a Doppler shift is disclosed in Journal of Geography 110 (4), pp. 529-543 (2001). FIG. 13 is a block diagram showing the basics of the Doppler shift compensating method disclosed in Journal of Geography 110 (4), pp. 529-543 (2001). The basic system shown in FIG. 13 includes a number of despreading sections 81a through 81e with respective reference signals that can be spread or despread in a range in which a Doppler shift would be produced. In this system, the M-sequence coded received signal is processed by the respective despreading sections 81a through 81e, which output their despread waveforms 82a through 82e independently of each other. In the example illustrated in FIG. 13, the reference signal of the despreading section 81c agrees with the Doppler shift, and therefore, the despread signal 82c has an outstanding peak of correlation. Meanwhile, the despread signals 82b and 82d before and after the despread signal 82c have somewhat low peaks of correlation. But in the despread waveforms 82a and 82e in which the reference signal is spread or despread quite differently from the Doppler shift, only correlation noise is observed. According to the method of Journal of Geography 110 (4), pp. 529-543 (2001), the highest peak of correlation is selected from the multiple despread waveforms 82 and used to measure the propagation time, for example.

Another Doppler shift compensating method is disclosed in Japanese Patent Application Laid-Open Publication Nos. 2007-202088 and 2006-279173. FIG. 14 illustrates the fundamental principle of that Doppler shift compensating method disclosed in Japanese Patent Application Laid-Open Publication No. 2007-202088, which adopts an orthogonal frequency division multiplexing (which will be abbreviated herein as "OFDM") method in which coding is carried out in a frequency range. Even such coding to be carried out in a frequency range is also significantly affected by a Doppler shift. When a Doppler shift is produced, the code that has been divided into the sub-carriers 91 shown in FIG. 14(a) will be spread or despread in the frequency range and will be received as the spread or despread sub-carriers 93 shown in FIG. 14(b). If such sub-carriers 93 are demodulated as they are, the original signal cannot be decoded. That is why according to the Doppler shift compensating method disclosed in Japanese Patent Application Laid-Open Publication No. 2007-202088, a Doppler shift compensating signal 92 is provided for a higher frequency range than the sub-carriers that should ordinarily be used for coding. As a result of the Doppler shift, the Doppler shift compensating signal 92 will turn into a signal 94 in FIG. 14(b) and a frequency shift 95 will be detected. According to Japanese Patent Application Laid-Open Publication No. 2007-202088, every sub-carrier 93 is re-sampled with the frequency shift 95 to restore the sub-carriers 96 of the original signal as shown in FIG. 14(c), and then the original signal is decoded by demodulating the sub-carriers 96. In the same way, according to the conventional technique disclosed in Japanese Patent Application Laid-Open Publication No. 2006-279173, the frequency shift of the sub-carriers 91 in the highest frequency range is also used as a Doppler shift compensating signal, and compensating for the Doppler shift of the sub-carriers as in Japanese Patent Application Laid-Open Publication No. 2007-202088.

The method disclosed in Non-Patent Document No. 1: Journal of Geography 110 (4), pp. 529-543 (2001) is a rather quick and secure Doppler shift compensating method. In addition, since no Doppler shift is supposed to be measured and then compensated for according to that method, it can also be used even when the received signal has produced multiple Doppler shifts. According to that method, however, it is still difficult to compensate for the Doppler shift perfectly and recover the correlation gain. That is why to ensure sufficiently high precision of measurement, the reference signal should be spread and despread at shorter intervals, which would require an increased number of despreading sections to provide. As a result, the size and cost of the hardware to use will rise too much to apply that technique to a consumer electronic device easily.

On the other hand, according to the method disclosed in Japanese Patent Application Laid-Open Publication Nos. 2007-202088 and 2006-279173, either a Doppler shift compensating signal is provided separately or a part of a signal is used as the Doppler shift compensating signal. In any case, the Doppler shift is estimated by using the Doppler shift compensating signal, and therefore, the compensation can get done rather accurately. According to such a method, however, the entire sub-carriers should be re-sampled and the signal should be recorded in its entirety. That is why to get the compensation done, a lot of memory space and processing time are needed. For that reason, if an acoustic wave is used as a carrier, the method disclosed in Japanese Patent Application Laid-Open Publication Nos. 2007-202088 and 2006-279173 is certainly applicable to low-speed data communications in which a relatively low processing rate is permitted. However, such a method should not be applied to processing that requires high speed response such as sensing an obstacle for a self-moving robot.

Furthermore, in sensing an obstacle for a self-moving robot, for example, generally there are an unspecified large number of objects to sense, which will include objects (such as persons) that move at various relative velocities. Consequently, as there will be a mixture of various relative velocities between the self-moving robot and the objects of sensing, it is difficult to apply the method disclosed in Japanese Patent Application Laid-Open Publication No. 2007-202088 that uses a compensating signal on an individual basis to such a situation.

SUMMARY OF THE INVENTION

It is therefore an object of the present invention to provide an ultrasonic measuring apparatus and method that can get measurements done accurately through simple processing even when the ultrasonic measuring apparatus should operate in an environment where it can be affected by an unspecified large number of Doppler shifts.

An ultrasonic measuring method according to the present invention uses a coded spread spectrum ultrasonic signal, which has a predetermined carrier frequency and which has been modulated with codes that have a coding period synchronized with the carrier frequency, to estimate at least one of the propagation distance and propagation orientation of the coded spread spectrum ultrasonic signal. The method includes the steps of: (A) receiving the coded spread spectrum ultrasonic signal in at least two receivers, and generating at least two received signals; (B) performing an quadrature detection on the at least two received signals using the carrier frequency, and producing I and Q components of the received signals; (C) performing phase difference processing on the I and Q components of the received signals with a coding period that is synchronized with the period of the carrier frequency, and obtaining I' and Q' components from which a phase shift caused by a Doppler shift has been canceled; (D) despreading the I' and Q' components of the received signals using different codes from the codes at time intervals that are synchronized with the carrier frequency, and obtaining despread I'' and Q'' components; (E) obtaining information about the amplitudes and phases of the respective received signals by carrying out computations on the I'' and Q'' components of the received signals; and (F) calculating at least one of the propagation distance and propagation orientation of the ultrasonic wave based on the information about the amplitudes and phases that has been obtained from the respective received signals.

In one preferred embodiment, two statuses in which the carrier frequency has phase angles of 0 and 180 degrees, respectively, are allocated to the codes.

In another preferred embodiment, the step (C) of performing the phase difference processing satisfies $$I'(t)=I(t)I(t-\tau_0)+Q(t)Q(t-\tau_0)$$

$$Q'(t)=I(t)Q(t-\tau_0)-Q(t)I(t-\tau_0)$$

where $\tau_0$ represents the coding period during transmission.

In still another preferred embodiment, the codes are an M-sequence pseudo random signal.

In a specific preferred embodiment, the different codes for use in the step (D) are an M-sequence pseudo random signal obtained by rotating the phase of the codes.

An ultrasonic measuring apparatus according to the present invention uses a coded spread spectrum ultrasonic signal, which has a predetermined carrier frequency and which has been modulated with codes that have a coding period synchronized with the carrier frequency, to estimate at least one of the propagation distance and propagation orientation of the coded spread spectrum ultrasonic signal. The apparatus includes: a receiving section for receiving the coded spread spectrum ultrasonic signal in at least two receivers, and generating at least two received signals; an quadrature detection section for performing an quadrature detection on the at least two received signals using the carrier frequency, and producing I and Q components of the received signals; a vector operation section for performing phase difference processing on the I and Q components of the received signals with a coding period that is synchronized with the period of the carrier frequency, and obtaining I' and Q' components from which a phase shift caused by a Doppler shift has been canceled; a despreading section for despreading the I' and Q' components of the received signals using different codes from the codes at time intervals that are synchronized with the carrier frequency, and obtaining despread I'' and Q'' components; a demodulating section for obtaining information about the amplitudes and phases of the respective received signals by carrying out computations on the I'' and Q'' components of the received signals; and a distance/orientation calculating section for calculating at least one of the propagation distance and propagation orientation of the ultrasonic wave based on the information about the amplitudes and phases that has been obtained from the respective received signals.

In one preferred embodiment, two statuses in which the carrier frequency has phase angles of 0 and 180 degrees, respectively, are allocated to the codes.

In another preferred embodiment, the vector operation section performs the processing so as to satisfy $$I'(t)=I(t)I(t-\tau_0)+Q(t)Q(t-\tau_0)$$

$$Q'(t)=I(t)Q(t-\tau_0)-Q(t)I(t-\tau_0)$$

where $\tau_0$ represents the coding period during transmission.

In still another preferred embodiment, the codes are an M-sequence pseudo random signal.

In a specific preferred embodiment, the different codes are an M-sequence pseudo spreading random signal obtained by rotating the phase of the codes.

According to the present invention, an quadrature detection signal of a received signal is processed with a coding period that is synchronized with the carrier frequency, thereby canceling the Doppler shift. Also, the despreading process is carried out using different codes from what has been used for transmission, thereby obtaining a despread signal with as high an SNR as if no Doppler shift were produced at all. On top of that, in that case, there may be multiple Doppler shifts (i.e., reflectors with mutually different relative velocities) within a predetermined Doppler shift range. Consequently, according to the present invention, the distance to the object or its orientation can be estimated accurately with the Doppler shift effect reduced significantly even without measuring the Doppler shift itself.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIG. 12 illustrates how a waveform changes due to the Doppler effect while a received signal is despread.

FIG. 14 illustrates the principle of another conventional Doppler shift canceling method.

DETAILED DESCRIPTION OF PREFERRED EMBODIMENTS

Figure 1:
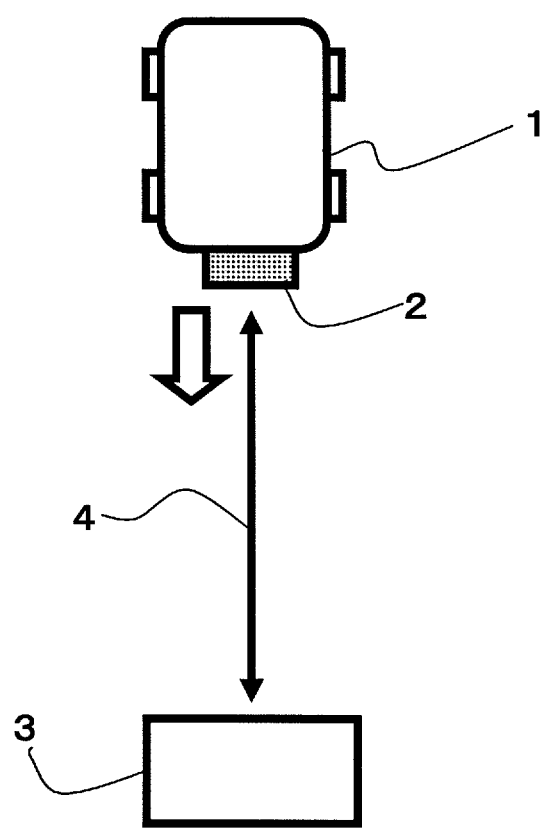
FIG. 1 illustrates an exemplary operating environment for an ultrasonic measuring apparatus according to the present invention.

Hereinafter, preferred embodiments of an ultrasonic measuring apparatus and method according to the present invention will be described with reference to the accompanying drawings. Even if there is a non-zero relative velocity between the transmitter and receiver of the ultrasonic measuring apparatus and if the carrier frequency of the ultrasonic wave is affected by a Doppler shift, the ultrasonic measuring apparatus of the present invention can reduce the Doppler shift effect significantly and estimate at least one of the propagation distance and propagation orientation of the ultrasonic wave. FIG. 1 illustrates an exemplary operating environment for the ultrasonic measuring apparatus of the present invention.

In FIG. 1, a moving body 1 may be a self-moving robot, for example. An ultrasonic measuring apparatus 2 is built in the moving body 1. The ultrasonic measuring apparatus 2 sends out an ultrasonic wave toward an object 3 and receives an ultrasonic wave that has been reflected from the object 3, thereby measuring either the length of the ultrasonic wave propagation path 4 or the distance from the object 3 to the ultrasonic measuring apparatus 2 itself. The apparatus 2 can also determine the orientation of the object 3 as viewed from the apparatus itself. If the moving body 1 moves in any of the directions indicated by the arrows in FIG. 1, there is a relative velocity between the moving body 1 and the object 3. Actually, the object 3 may also move. Specifically, there is a relative velocity (1) if one of the moving body 1 and the object 3 stands still and the other is moving in an arbitrary direction at an arbitrary velocity, (2) if both of the moving body 1 and the object 3 are moving in mutually different directions at arbitrary velocities, and (3) if both of the moving body 1 and the object 3 are moving in the same direction at mutually different velocities. In any case, if there is a relative velocity, the ultrasonic signal transmitted and received by the ultrasonic measuring apparatus 2 is affected by a Doppler shift.

Hereinafter, an ultrasonic measuring apparatus 2 and ultrasonic measuring method will be described as a preferred embodiment of the present invention. In the preferred embodiment to be described below, the ultrasonic measuring apparatus 2 is supposed to include a transmitter that sends out an ultrasonic wave and a driving section that drives the transmitter. However, in an alternative preferred embodiment, the present invention may also be carried out as an ultrasonic measuring apparatus that includes neither a transmitter nor a driving section but that receives an ultrasonic wave from an independent ultrasonic transmitter, thereby estimating the distance to the ultrasonic transmitter or its orientation, and as an ultrasonic measuring method that uses such an apparatus.

In this preferred embodiment, the ultrasonic wave sent out by the ultrasonic measuring apparatus 2 shown in FIG. 1 is a spread spectrum wave that has been coded with an M-sequence code. Alternatively, the ultrasonic wave may also have been coded with any other pseudo random signal sequence such as the Barker sequence or the Golay sequence. As a modulation method for coding, a bi-phase phase shift keying in which spreading code "1" represents a sinusoidal wave with a predetermined frequency and spreading code "−1" represents a sinusoidal wave with the predetermined frequency that has had its phase inverted by 180 degrees, may be used. The sinusoidal wave with such a predetermined frequency is called a "carrier". That is to say, phase angles of 0 and 180 degrees of the carrier frequency are allocated to the spreading codes "1" and "−1", respectively.

The wave number of the sinusoidal waves included in the single spreading code is preferably determined by the bandwidth of the transmitter and receiver to use. That is to say, if the bandwidth is narrow, then the wave number may be increased. Otherwise, the wave number may be decreased. Generally speaking, the smaller the wave number, the higher the spread spectrum ratio and the higher the noise resistance. And the larger the order of the M-sequence (i.e., the longer the M-sequence), the higher the noise resistance. However, as the order increases, the ultrasonic wave to transmit gets longer and longer and is more and more easily affected by any variation in the environment (e.g., a Doppler shift among other things). For example, if the carrier frequency is 40 kHz and if the wave number of sinusoidal waves included in a code is three and if a seventh-order M sequence is used, then the ultrasonic wave to transmit will have a duration of approximately 9.5 ms.

Figure 2:
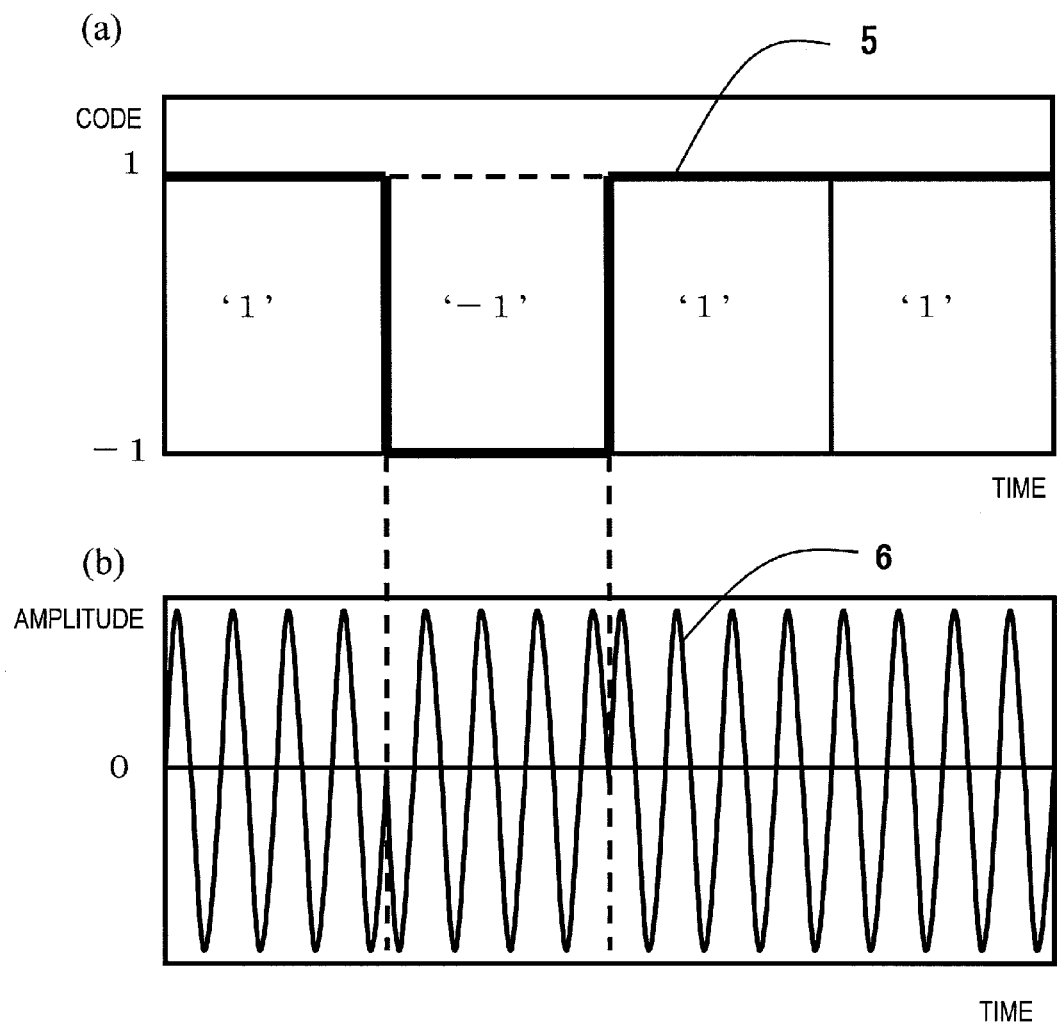
FIG. 2 illustrates how the bi-phase phase shift keying for use in the present invention works.

Portions (a) and (b) of FIG. 2 illustrates how the bi-phase phase shift keying works. For example, if a sinusoidal carrier is spread by the bi-phase phase shift keying using a spreading code 5 represented as "1, −1, 1, 1" as shown in portion (a) of FIG. 2, a random wave with the waveform 6 shown in portion (b) of FIG. 2 can be obtained. In the waveform 6, the wave number of the carrier per code is four and the phase inverts at the boundary between the code "1" and the code "−1".

Figure 3:
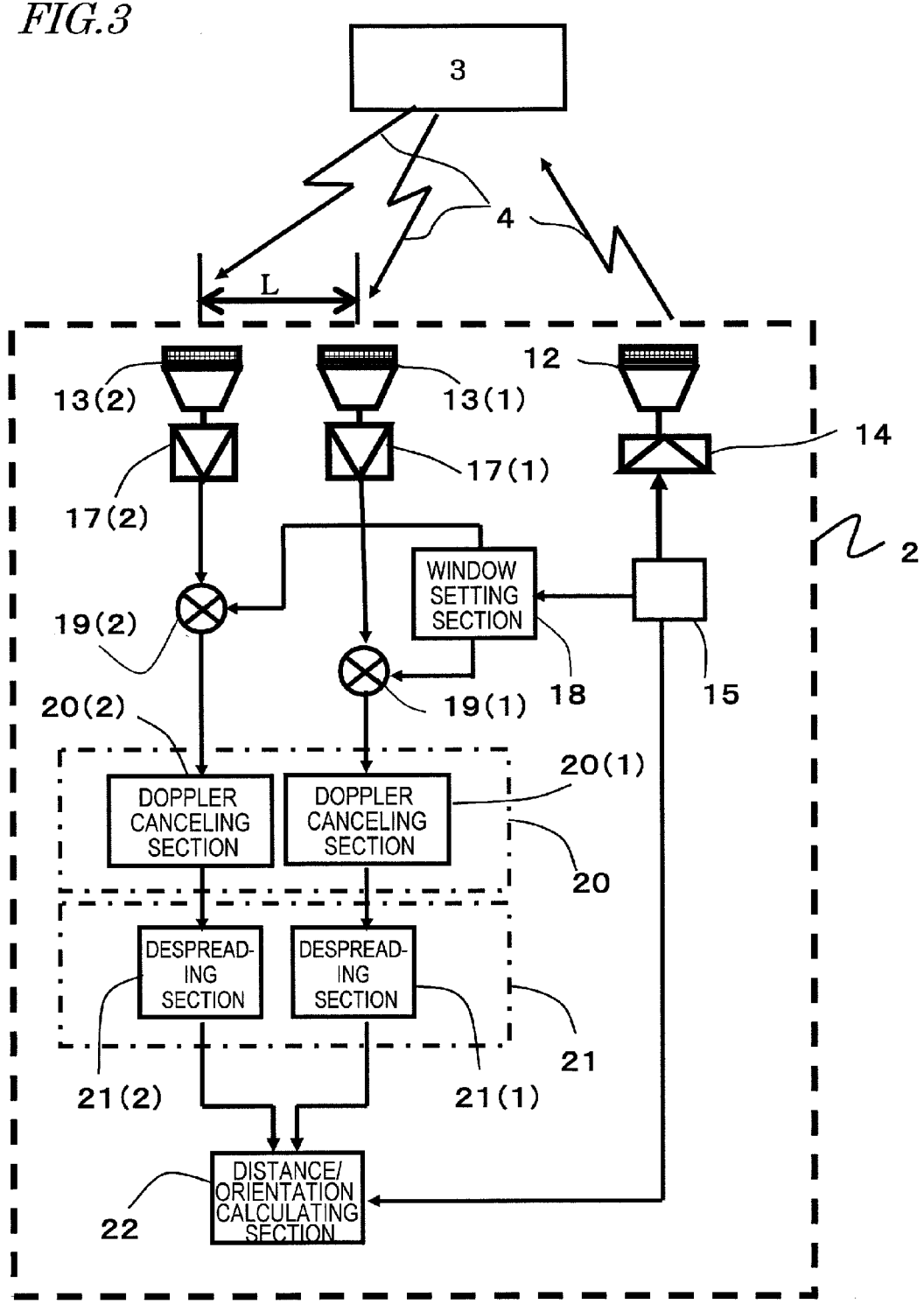
FIG. 3 is a block diagram illustrating a basic arrangement for an ultrasonic measuring apparatus according to a preferred embodiment of the present invention.

FIG. 3 is a block diagram illustrating a second basic arrangement for an ultrasonic measuring apparatus 2 according to a preferred embodiment of the present invention. The ultrasonic measuring apparatus 2 includes a transmitter 12, a first receiver 13(1), a second receiver 13(2), a transmitting section 14, a computing section 15, a first receiving section 17(1), a second receiving section 17(2), a window setting section 18, a first Doppler canceling section 20(1), a second Doppler canceling section 20(2), a first despreader 21(1), a second despreader 21(2), and a distance/orientation calculating section 22. The first and second receivers 13(1) and 13(2) are arranged adjacent to each other with a space L left between them.

According to this preferred embodiment, an ultrasonic wave is received by the first and second receivers 13(1) and 13(2), which calculate the propagation times of the ultrasonic wave received, estimate the distances and also calculate the propagation orientation of the ultrasonic wave based on the difference in propagation time between them. In this description, the first and second receivers 13(1) and 13(2) will sometimes be collectively referred to herein as a "receiver 13". In the same way, the first and second Doppler canceling sections 20(1) and 20(2) will sometimes be collectively referred to herein as a "Doppler canceling section 20" and the first and second despreaders 21(1) and 21(2) as a "despreader 21".

In this preferred embodiment, the ultrasonic measuring apparatus 2 includes two receivers to calculate the orientation. If a three-dimensional orientation needs to be obtained, for example, the present invention may also be carried out as an ultrasonic measuring apparatus that includes three or more receivers and their associated arrangement.

If the maximum measuring distance (i.e., the measuring limit) of the ultrasonic measuring apparatus 2 is set within the range of 5 m to 10 m, the frequency of ultrasonic waves to use may be determined with that maximum measuring distance and the attenuation characteristic of the ultrasonic waves in the air taken into consideration. The higher the frequency of the ultrasonic waves, the shorter their wavelength and the higher the time resolution achieved during the propagation time measurement. However, the higher the frequency, the greater the degree of attenuation of the ultrasonic waves in the air, too. Considering the general performances of the transmitter 12 and the receiver 13, if the maximum measuring distance falls within the range of 5 m to 10 m, for example, it is appropriate to use an ultrasonic wave with a frequency of 100 kHz or less. In this preferred embodiment, an ultrasonic wave with a frequency of 40 Hz is used for measurements.

The transmitter 12 and the receiver 13 may use either ultrasonic vibrators, which are flexible vibrators made of a piezoelectric ceramic, or vibrators including a PVDF piezoelectric polymer film. As long as ultrasonic vibrators compliant with the same standard are used as the first and second receivers 13(1) and 13(2), difference in characteristic between the receivers will hardly affect the measuring accuracy.

The computing section 15 may be implemented as a microcomputer, for example, to generate a drive signal and control the Doppler canceling section 20, the despreader 21, the window setting section 18 and the distance/orientation calculating section 22. The drive signal generated by the computing section 15 is a random wave 6 that has been subjected to the spreading process with the M-sequence spreading code 5 (see FIGS. 2(a) and 2(b)) and converted by the transmitting section 14 into an analog signal, thereby driving the transmitter 12.

Figure 4:
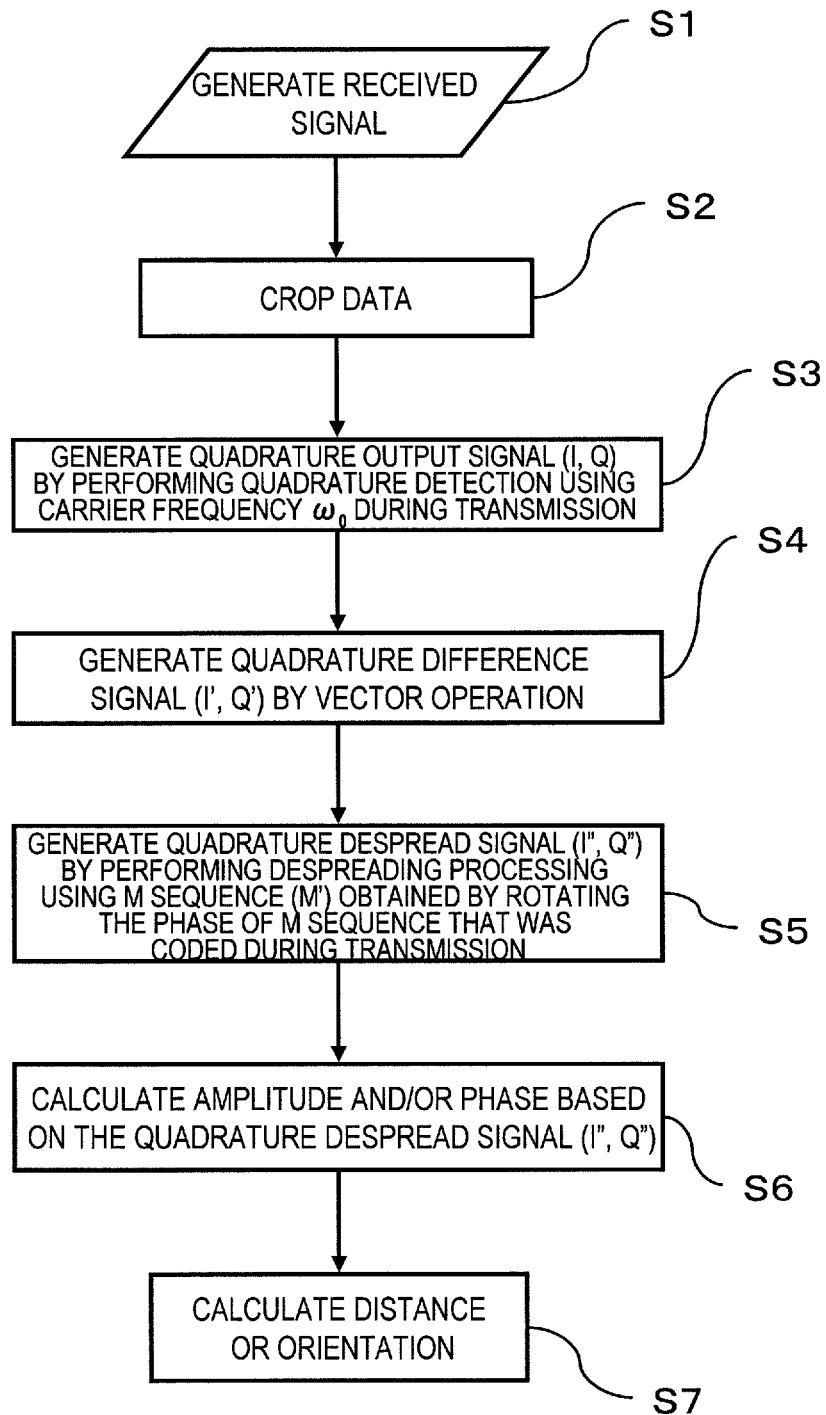
FIG. 4 is a flowchart showing the flow of signal processing according to the present invention.

FIG. 4 is a flowchart showing a preferred embodiment of an ultrasonic measuring method to be performed by the ultrasonic measuring apparatus 2 of this preferred embodiment. Hereinafter, it will be described with reference to the flowchart shown in FIG. 4 and the block diagram shown in FIG. 3 specifically how to carry out the ultrasonic measuring method.
(Step S1)

Step S1 corresponds to the processing step (A) in the claims. In this processing step, the first and second receivers 13(1) and 13(2) receive an ultrasonic wave that has been sent out by the transmitter 12 and then reflected from the object 3, and convert the ultrasonic wave received into electrical received signals. The first and second receiving sections 17(1) and 17(2) amplify those received signals and then convert the signals into digital signals by A/D conversion. The received signals that have been obtained by the first and second receiving sections 17(1) and 17(2) are processed in the following procedure. The sample rate of the A/D conversion is preferably at least four times, and is generally set to be an integral number of times, as high as the carrier frequency during transmission.

If there is any relative velocity between the reflector 3 and the ultrasonic measuring apparatus 2, each of those received signals is affected by a Doppler shift and the phase inversion point of the carrier shown in portion (b) of FIG. 2 (i.e., the period of the code) has changed from what it was during transmission. That is why even if the A/D converted received signal were despread as it is, the correlation gain of the despread signal would decrease too steeply to determine the correlation correctly. For that reason, the Doppler cancellation process needs to be done.

The Doppler cancellation process may be carried out by detecting the magnitude of the Doppler shift (i.e., the magnitude of the frequency variation) and correcting the received signal using the magnitude of the Doppler shift that has been detected. According to that method, however, the magnitude of the Doppler shift should be detected highly accurately. Thus, by performing the following processing steps S2 through S6, the ultrasonic measuring apparatus 2 of this preferred embodiment obtains a received signal that is much less affected by the Doppler shift just by subjecting the received signal to signal processing without detecting the magnitude of the Doppler shift.
(Step S2)

Step S2 is included in the processing step (A) in the claims. The window setting section 18 that is controlled by the computing section 15 crops a signal that covers a (T2−T1) interval between two points in time T1 and T2 that are predetermined amounts of time later than a transmission start time T0 from the received signal that has been converted into digital data in Step S1.

Specifically, the window setting section 18 outputs either zero or a preset non-zero constant to multipliers 19(1) and 19(2), thereby cropping a part of the received signal that has been converted into digital data. The cropping times (T1, T2) are set based on the maximum measurable distance of the ultrasonic measuring apparatus and the duration of the ultrasonic wave for use to make measurements.

For example, if the measuring range is 1 m through 5 m, the propagation distance will fall within the range of 2 m to 10 m because an ultrasonic wave goes back and forth between an object within the measuring range and the ultrasonic measuring apparatus. Since the speed of sound of an ultrasonic wave in the air is approximately 340 m/s, the propagation distances of 2 m and 10 m can convert into propagation times of about 6 ms and about 30 ms, respectively. On the other hand, supposing the carrier frequency is 40 kHz and the wave number of sinusoidal waves included in a single code is three, a seventh-order M-sequence signal will have a duration of approximately 9.5 ms. That is why if the transmission time T0 is the origin, the time T1 at which the ultrasonic wave arrives earliest will be 6 ms and the time T2 at which the ultrasonic wave arrives latest will be 39.5 ms. For that reason, supposing the time T0 at which the ultrasonic wave has started to be transmitted is zero, the window setting section 18 sets a window for cropping the received data so that an interval between the time T1 (=6 ms) and the time T2 (=39.5 ms) is included in the window.

The multipliers 19(1) and 19(2) output the received signal that has been cropped to the Doppler canceling section 20. In this preferred embodiment of the present invention, the Doppler shift is canceled using, as it is, the sample rate that is synchronized with the carrier frequency while the ultrasonic wave is being transmitted (and that is an integral number of times as high as the carrier frequency).

Figure 5:
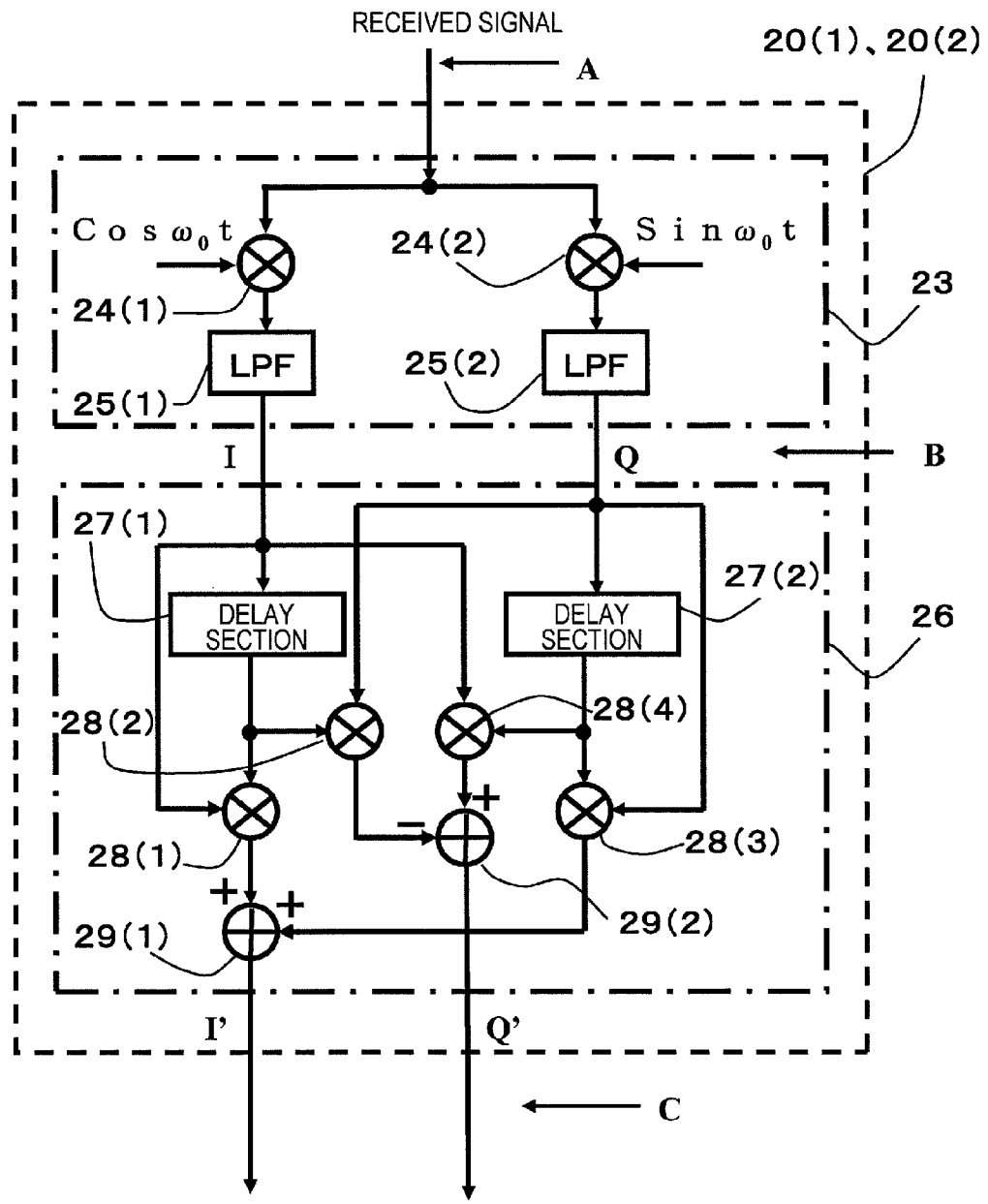
FIG. 5 is a block diagram illustrating a basic configuration for the Doppler canceling sections 20 of the ultrasonic measuring apparatus.

FIG. 5 is a block diagram illustrating a specific configuration for the Doppler canceling sections 20(1) and 20(2), each of which includes an quadrature detection section and a vector operation section 26. The quadrature detection section 23 includes multipliers 24(1) and 24(2) for multiplying the received signal by $\cos \omega_0 T$ and $\sin \omega_0 T$ that are based on the carrier frequency $\omega_0$ during transmission, and low-pass filters 25(1) and 25(2). The vector operation section 26 includes delay sections 27(1) and 27(2), multipliers 28(1), 28(2), 28(3) and 28(4), and adders 29(1) and 29(2).
(Step S3)

Step S3 corresponds to the processing step (B) in the claims and is performed by the quadrature detection section 23. Specifically, the received signal is broken down by the quadrature detection section 23 into I and Q components, which are two quadrature signals that cross each other at right angles, based on the carrier frequency $\omega_0$ during transmission. The received signal that is affected by a Doppler shift can be represented by the following Equation (1):

$$w(t)=A_d(t)b_d(t-T_p)\mathrm{Cos}(\omega_d(t-T_p)) \tag{1}$$

where w(t) represents the received signal, $A_d(t)$ represents the amplitude value of the received signal, $\omega_d$ represents the carrier frequency at which the received signal is affected by a Doppler shift, $T_p$ represents the ultrasonic wave propagation time (i.e., the interval between the time of transmission and the time of reception), and $b_d(t)$ is an M-sequence that is affected by the Doppler shift and is represented by the following Equation (2):

$$b_d(t) = \begin{cases} M_n \in \{-1, 1\}, & (n-1)\tau_d \le t \le n\tau_d, \quad 1 < n < N \\ 0, & \text{else} \end{cases} \tag{2}$$

where Mn represents an $n^{th}$ value (which is either −1 or 1) of the M-sequence, N represents the number of data of the M-sequence, and $\tau_d$ represents the coding period of the M-sequence at the carrier frequency at which the received signal is affected by the Doppler shift. In this case, the coding period is obtained as the product of the carrier period and the wave number of the carriers included in a code. It should be noted that although the received signal is actually A/D converted into a digital signal (which is a discrete signal) by the receiving section 17, the received signal is supposed to be represented herein as a continuous wave signal for convenience sake.

The I(t) and Q(t) components obtained by subjecting the received signal represented by Equation (1) to the quadrature detection are given by the following Equations (3) and (4), respectively:

$$\begin{aligned} I(t) &= w(t)\mathrm{Cos}\omega_0 t \mid_{LPF} \\ &= CA_d(t)b_d(t-T_p)\mathrm{Cos}(\omega_d T_p - (\omega_d - \omega_0)t) \\ &= CA_d b_d(t-T_p)\mathrm{Cos}(\omega_d T_p - \Delta\omega_d t) \end{aligned} \tag{3}$$

$$\begin{aligned} Q(t) &= w(t)\mathrm{Sin}\omega_0 t \mid_{LPF} \\ &= CA_d(t)b_d(t-T_p)\mathrm{Sin}(\omega_d T_p - (\omega_d - \omega_0)t) \\ &= CA_d b_d(t-T_p)\mathrm{Sin}(\omega_d T_p - \Delta\omega_d t) \end{aligned} \tag{4}$$

where $\Delta\omega_d$ represents the Doppler shift frequency. Also, the amplitude $A_d(t)$ changes so gently that the amplitude $A_d(t)$ is supposed to be a constant $A_d$. Also, C represents a constant that is unique to the quadrature detection section 23. According to these Equations (3) and (4), the I and Q components involve not only positive and negative amplitude variations that should be caused by bi-phase phase shift keying M-sequence coding but also sinusoidal components that vary gently at a Doppler shift frequency $\Delta\omega_d$. That is why by despreading the I and Q components, even if the relative velocity is small, the correlation output will decrease significantly due to a variation in sinusoidal wave that has been caused by the Doppler shift. And then the I(t) and Q(t) components are input to the vector operation section 26.
(Step S4)

Step S4 corresponds to the processing step (C) in the claims and is performed by the vector operation section 26, which includes delay sections 27, multipliers 28 and adders 29 and which carries out the vector operation given by the following Equation (5):

$$I'(t)=I(t)I(t-\tau_0)+Q(t)Q(t-\tau_0)$$

$$Q'(t)=I(t)Q(t-\tau_0)-Q(t)I(t-\tau_0) \tag{5}$$

where $\tau_0$ is the coding period during transmission.

By carrying out the operation represented by Equation (5), the vector operation section 26 produces I'(t) and Q'(t) components, which are quadrature differential signals, based on the I(t) and Q(t) components of the received signal. The I'(t) and Q'(t) components are represented by the following Equations (6) and (7), respectively:

$$I'(t)=C^2 A_d^2 b_d(t-T_p-\tau_0)b_d(t-T_p)\mathrm{Cos}(\Delta\omega_d\tau_0) \tag{6}$$

$$Q'(t)=C^2 A_d^2 b_d(t-T_p-\tau_0)b_d(t-T_p)\mathrm{Sin}(\Delta\omega_d\tau_0) \tag{7}$$

where $\tau_0$ represents the coding period during transmission and indicates the time delay caused by the delay sections 27 shown in FIG. 5. Although the coding period actually changes from $\tau_0$ into $\tau_d$ due to the Doppler shift effect, this preferred embodiment of the present invention dares to use $\tau_0$ because $\tau_d$ is unknown. The I'(t) and Q'(t) components produced by the vector operation section 26 become quadrature output components that have a constant phase to be determined by the Doppler shift $\Delta\omega_d$ and $\tau_0$. As the vector operation processing represented by Equation (5) is essentially a process for calculating the phase difference on a coding period basis, this processing will be referred to herein as "phase difference processing". As a result of the phase difference processing, those components that vary with the Doppler shift frequency $\Delta\omega_d$ as observed in the I(t) and Q(t) components are transformed into temporal variation internal constants (with a fixed phase) to be determined by the Doppler shift frequency $\Delta\omega_d$ and the coding period $\tau_0$. That is to say, I'(t) and Q'(t) have substantially constant amplitude values irrespective of the time. That is why if the despreading process is carried out using an appropriate reference code in such a state, the decrease in correlation output due to a variation in amplitude can be minimized.

Figure 6:
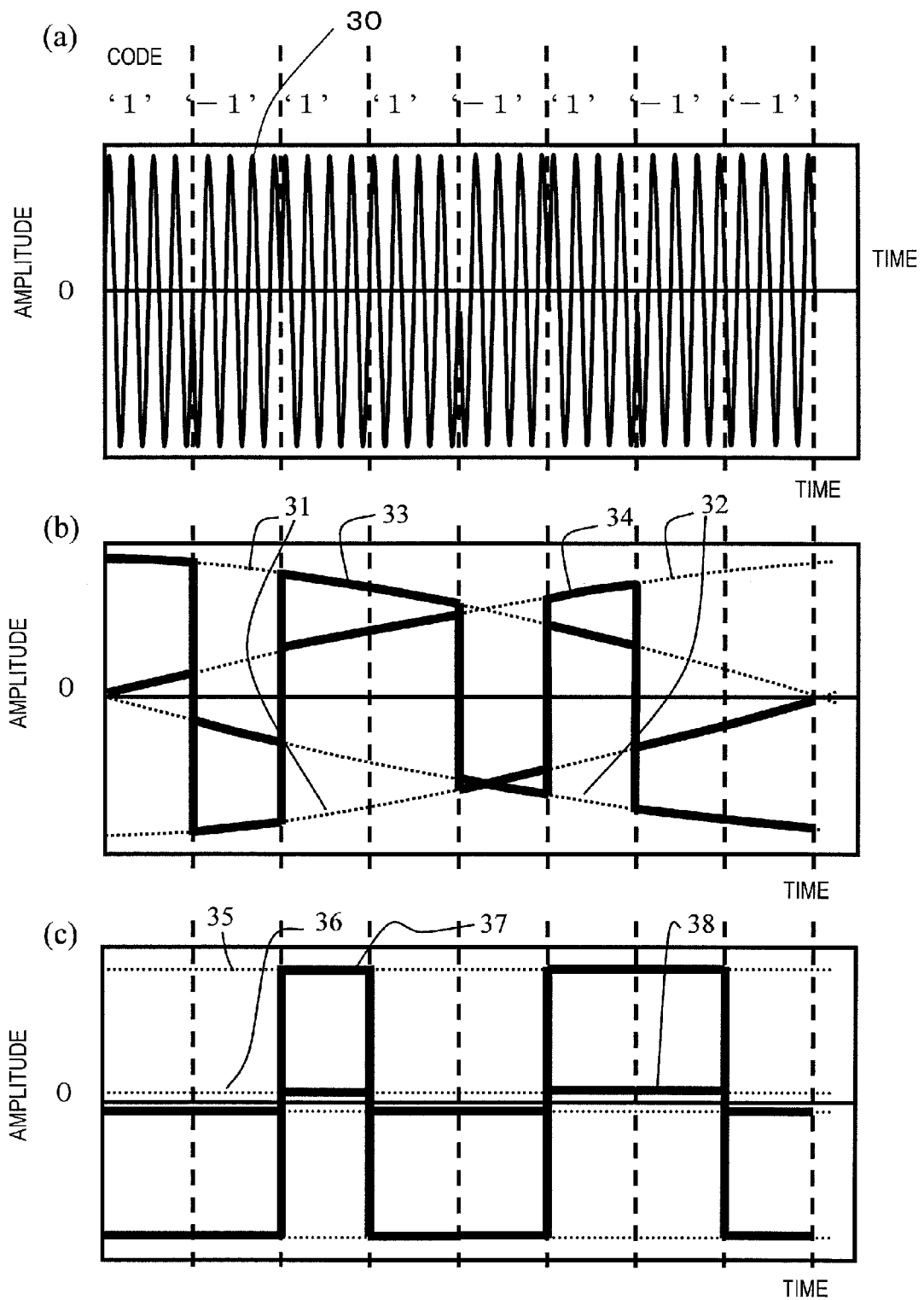
FIG. 6 shows exemplary waveforms at respective stages of the processing performed by the Doppler canceling section.

Next, it will be described with reference to its signal waveforms how the received signal is processed in the processing steps S3 and S6. Portion (a) of FIG. 6 illustrates a received signal 30 to be input to the quadrature detection section 23. This received signal 30 has been modulated while being subjected to a Doppler shift in the coding period and does have a carrier. Portion (b) of FIG. 6 illustrates the I-component envelopes 31 and Q-component envelopes 32 that have been output from the quadrature detection section 23 as a result of the processing step S3 and I and Q components 33 and 34 that are represented as modulated codes. Since the I and Q components have a sinusoidal wave component that varies gently at the Doppler shift frequency $\Delta\omega_d$ as described above, their amplitudes are not constant.

Portion (c) of FIG. 6 illustrates the I'-component envelopes 35 and Q'-component envelopes 36 that have been output from the vector operation section 26 and I' and Q' components 37 and 38 that are represented as modulated codes. The I' and Q' components have substantially constant amplitudes irrespective of the time. However, as can be seen easily by comparing portions (a) and (c) of FIG. 6 to each other, the code sequences of the I' and Q' components are different from the code sequence yet to be subjected to the quadrature detection or the code sequence of the transmitted signal.
(Step S5)

Step S5 corresponds to the processing step (D) in the claims. As the variation in amplitude due to a Doppler shift has been reduced as a result of the processing steps S3 and S4, a reference code to use for despreading needs to be considered next. Specifically, as a result of the processing performed by the vector operation section 26 in Step S4, the original M-sequence has changed into a different sequence. That is why the I' and Q' components are subjected to the despreading process by using a different code from what has been used during transmission at a time interval that is synchronized with the carrier frequency.

In this case, supposing $\tau_0 \approx \tau_d$, the M-sequence $b_d$ in Equations (6) and (7) can be represented by the following Equation (8):

$$b_d(t-T_p-\tau_0)b_d(t-T_p) \approx U(t-T_p)M_{n-1}M_n \qquad (8)$$

In Equation (8), $U(t-T_p)$ is a unit function representing the propagation time. As described above, the I' and Q' components of the quadrature difference signal are obtained by the vector operation section 26 by multiplying together the original M-sequence and an M-sequence shifted from the original M-sequence by one coding period $\tau_0$. In this case, the product $M_{n-1}M_n$ of the M sequence and another M-sequence shifted from the former M sequence by one coding period is obtained by shifting the phase of the original M sequence.

Figure 7:
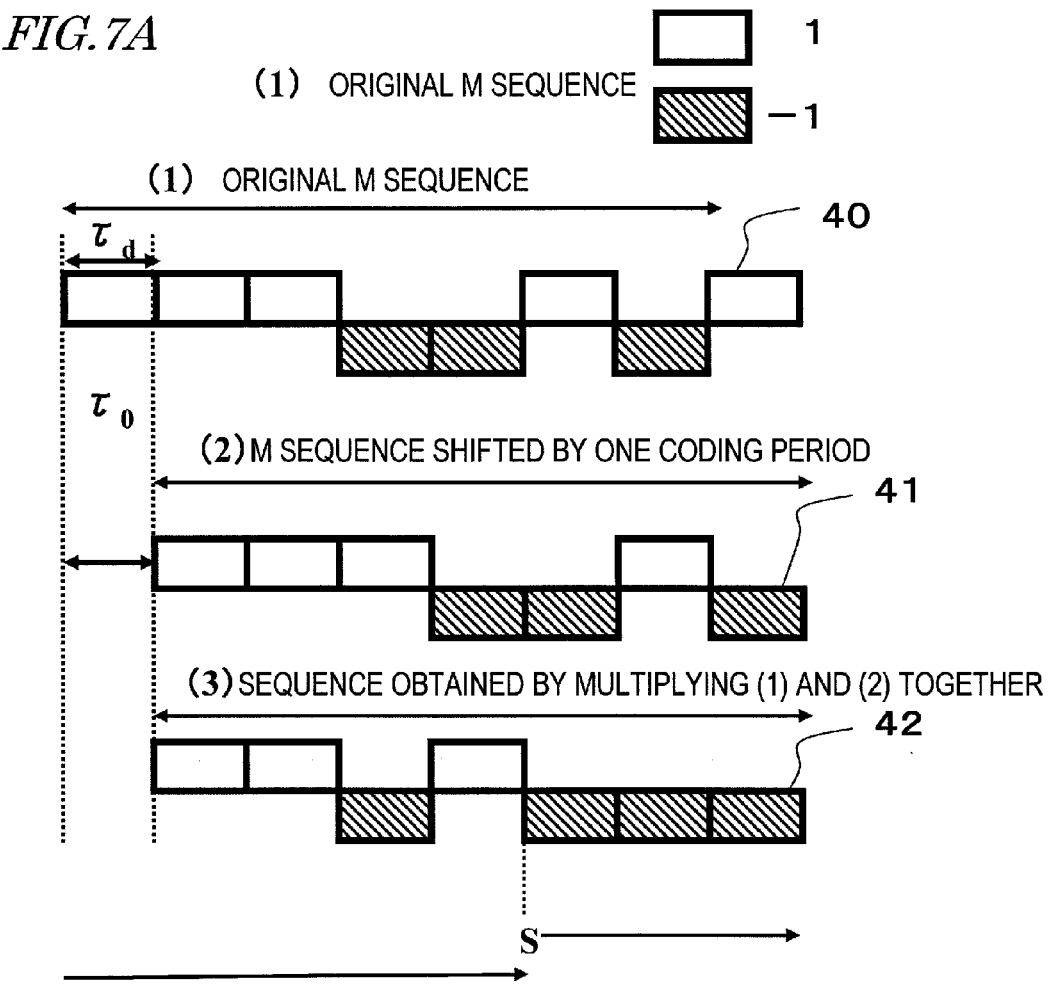
FIG. 7A illustrates similarity between M sequences.
FIG. 7B illustrates a specific example showing the similarity between M sequences.

This feature will be described with reference to FIGS. 7A and 7B. In FIG. 7A, (1) illustrates the original M sequence (i.e., an M sequence 40 of codes that was used during transmission) and (2) illustrates an M sequence 41 that is delayed by one coding period with respect to the M sequence 40.

The product of the M sequence 40 and the M sequence 41 that is delayed by one coding period (i.e., (1)×(2)) is the sequence 42 illustrated in (3). A portion of this sequence 42 that starts at the S position is a phase-inverted version of the original M sequence 40 (if these two sequence are compared to each other by making the sequence 42 return to the top upon reaching the end).

This example will be described more specifically. First of all, suppose the order of each M sequence is three (i.e., the number of codes in each sequence is seven ($=2^3-1$)). As shown in FIG. 7B, a third-order M sequence (i) may be 1, 1, 1, −1, −1, 1, −1. In this case, to indicate the order of codes clearly, superscripts of 1 through 7, representing their code order, are added to these seven codes (i.e., $1^1$, $1^2$, $1^3$, $-1^4$, $-1^5$, $-1^6$, $-1^7$). FIG. 7B also illustrates an M sequence (ii) shifted from the third-order M sequence by one coding period. If these two code sequences are multiplied together, the code sequence (i)×(ii) can be obtained. And if the code sequence (i)×(ii) is inverted, a code sequence (i') is obtained. In the sequence (i'), a series of seven consecutive codes that start at the sixth position and that are included in the dashed rectangle is the same as a portion of the M sequence (i) in the dashed rectangle. On the other hand, the first through fifth codes of (i') are identical with the third through seventh codes of the M sequence (i). In other words, the code sequence (i') is an M sequence 1, −1, −1, 1, −1, 1, 1 (i.e., $1^3$, $-1^4$, $-1^5$, $1^6$, $-1^7$, $1^1$, $1^2$) obtained by rotating the phase of the M code sequence (i) by three codes in the positive direction. As can be seen, the product of an M sequence and another M sequence that is shifted from the former M sequence by one coding period has the property of an M sequence. Such a property is unique to an M sequence and is called "similarity between M sequences".

In such a sequence that is obtained by inverting the product of an original M sequence and another M sequence shifted from the original M sequence by one coding period, it depends on the original M sequence to use at what position the same code sequence as the original one starts (i.e., how many codes the phase of the original M sequence needs to be rotated to obtain that sequence that is the inversion of the product of the original M sequence and the M sequence shifted by one coding period). However, once the M sequence to use is determined, that value (i.e., the degree of rotation) is determined unequivocally.

According to this preferred embodiment of the present invention, that similarity between M sequences is used. Specifically, an M sequence to transmit is determined and then checked out to find how many codes the phase of the M sequence thus determined needs to be rotated to obtain a sequence that is the inversion of the product of the original M sequence and an M sequence shifted by one coding period.

Supposing the code length of an M sequence to transmit is an $N^{th}$ order and each code is m (which is either 1 or −1), the M sequence can be represented as $m^1, \ldots m^k, \ldots$ and $m^N$ (where k is a natural number that satisfies 2<k<N). On the other hand, an M sequence to demodulate, which is obtained by rotating the phase of the former M sequence, is represented as $m^i, \ldots m^k, \ldots m^N, \ldots m^1, \ldots$ and $m^{i-1}$ (where i is a natural number that satisfies 1≤i<k). By using that M sequence, obtained by rotating the phase of the original M sequence, as an M sequence to demodulate, the I' and Q' components of the quadrature difference signal are subjected to the despreading process. Strictly speaking, to obtain the M sequence to demodulate, the phase of the original M sequence needs to be rotated and then inverted. However, even if the I' and Q' components are despread using the M sequence to demodulate that has not had its phase inverted, the phase of the I' and Q' components will be just inverse as a whole, and the I' and Q' components themselves will never affect the result of computations for calculating the amplitude and phase of the received signal.

Figure 8:
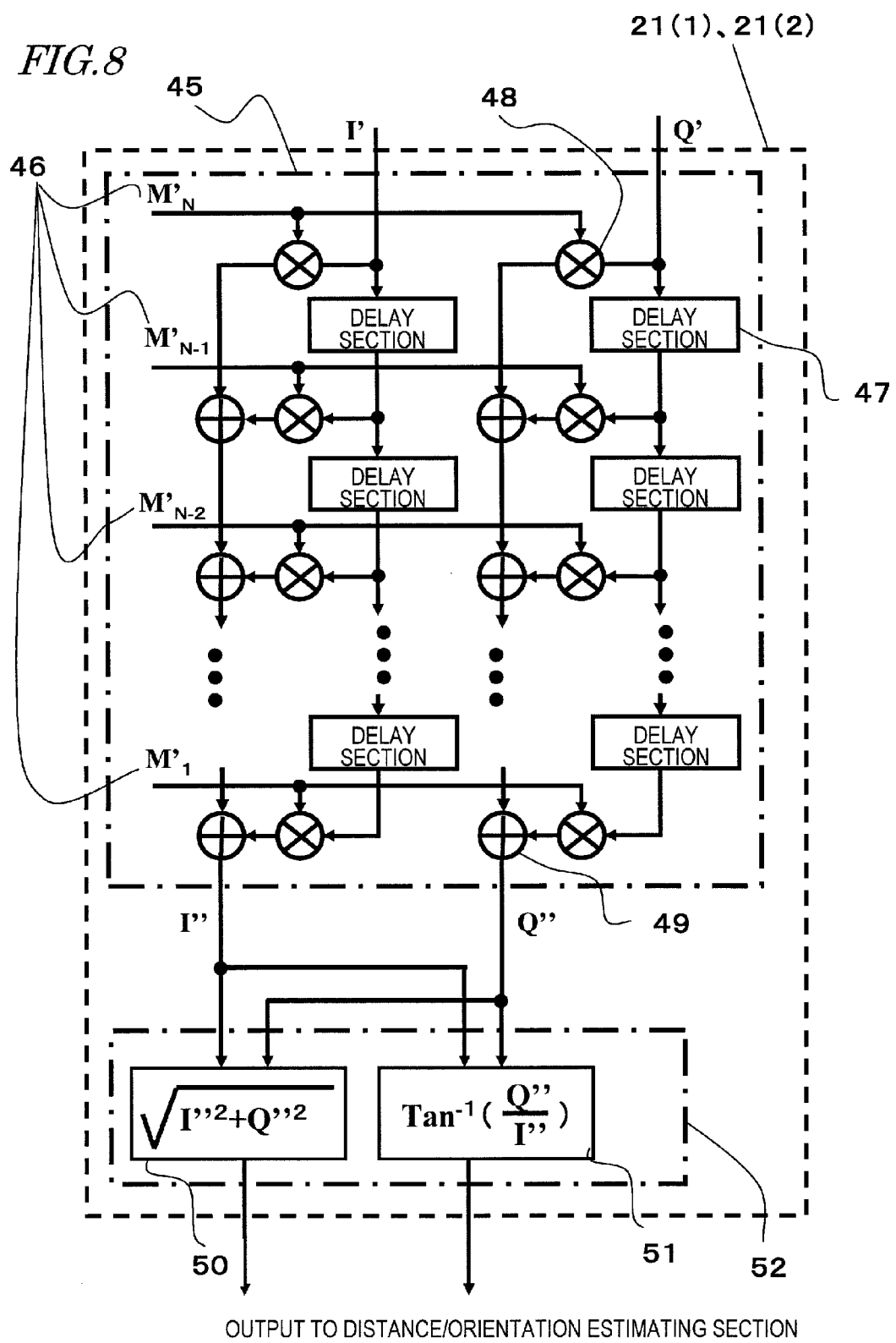
FIG. 8 is a block diagram illustrating a fundamental configuration for the despreaders 21 of the ultrasonic measuring apparatus.

FIG. 8 is a block diagram illustrating the fundamental processing to be performed by the despreading section in a preferred embodiment of the present invention. The despreading section 45 performs despreading processing by using the M sequence 46 to demodulate for the I' and Q' components of the quadrature difference signal, which have been supplied from the vector operation section 26 of the Doppler canceling section 20. The despreading section 45 further includes delay sections 47, multipliers 48 and adders 49, and gets the correlation between the I' components and correlation between the Q' components obtained every coding period by a correlator consisting of these elements. In this case, the delay sections 47 cause a time delay $\tau_0$. The output of the despreading section 45 is an quadrature despread signal, which includes a despread I" component and a despread Q" component. If the received signal is represented as a complex number, then each of these components consists of a real part and an imaginary part.

(Step S6)

Step S6 corresponds to the processing step (E) in the claims. In this Step S6, the amplitude of the received signal that has had its Doppler shift effect canceled and the phase signal are estimated by using the quadrature despread signal that has been despread in the previous processing step S5. Specifically, the I" and Q" components of the quadrature despread signal, which are the output of the despreading section 45 shown in FIG. 8, are input to the demodulating section 52, which includes an amplitude estimator 50 and a phase estimator 51 and which estimates the amplitude and the phase by performing the processing shown in FIG. 8. More specifically, the amplitude estimator 50 calculates the square of the I" component and that of the Q" component, adds the two squares together, and calculates the root of the sum of the squares, thereby obtaining the amplitude of the received signal. On the other hand, the phase estimator 51 calculates the arctangent of the ratio of the Q" component to the I" component, thereby obtaining the phase of the received signal.

By performing this series of processing steps S2 through S6 on each of the received signals that have been obtained by the first and second receiving sections 17(1) and 17(2), the amplitudes and phases of those received signals of the first and second receiving sections 17(1) and 17(2) can be obtained.
(Step S7)

Step S7 corresponds to the processing step (F) in the claims. In this Step S7, the amplitude and phase that have been estimated in the previous processing step S6 are input to the distance/orientation calculating section 22, which estimates the propagation time and orientation of the ultrasonic wave and obtains the location information of the object 3 by making computations.

For example, by reference to the received signal's amplitude information that has been obtained by making those computations, a point in time when the amplitude of the received signal becomes equal to or greater than a predetermined amplitude value may be supposed to be a time when the ultrasonic wave that has come from the object 3 arrives. By multiplying a half of the time interval from a time when the transmitter 12 sent out an ultrasonic wave and a time when the ultrasonic wave arrives by the propagation velocity of the ultrasonic wave, the distance D1 from the object 3 to the first receiving section 17(1) and the distance D2 from the object 3 to the second receiving section 17(2) are obtained. The space between the first and second receiving sections 17(1) and 17(2) is L. Thus, by determining either the vertex positions or the orientation of a triangle to be formed by the distances D1 and D2 and the space L as its three sides by the triangulation principle, the orientation of the object 3 can be determined. If the distance from the object 3 to either the first receiving section 17(1) or the second receiving section 17(2) needs to be measured more accurately, then the phase of the received signal may be used. In this case, both or only one of the orientation of the object 3 and the distance to the object 3 may be obtained.

The despreader 21 of this preferred embodiment sets the time delay caused by the delay sections to be $\tau_0$. The M sequence that has been spread as a result of a Doppler shift actually has a coding period of $\tau_d$. That is why even if $\tau_0 \approx \tau_d$ but if the M sequence has a large order, the difference in period will accumulate one code after another, the code of the received data at the end of the M sequence will soon disagree with the code of the M sequence to demodulate, and the correlation gain will decrease gradually. Among other things, the difference in coding period will be biggest at the last code of the M sequence. For example, supposing an ultrasonic wave with a frequency of 40 kHz is used as a carrier, the wave number per code is three, the M sequence is of the seventh order (with 127 codes), and the sonic wave has a velocity of 340 m/s, a shift of one coding period will be produced at the last code as the peak of correlation when there is a relative velocity of approximately 2.7 m/s. In a situation where the relative velocity is approximately 2.7 m/s, even if the coding period is supposed to be $\tau_0$, the peak of correlation will agree with the one to be obtained in a situation where there is no Doppler shift. A person's normal velocity is 1.6 m/s, while a self-moving robot's normal velocity is 1 m/s or less when operating in an indoor environment. That is why considering these velocities, the method of the present invention, by which the Doppler shift effect can be canceled just by adding relatively simple hardware or software even without measuring the Doppler shift itself, should be a very effective technique.

As can be seen, according to the present invention, the quadrature detected output of the received signal is processed at an interval that is synchronized with the coding period associated with the carrier frequency during transmission, thereby reducing the Doppler shift effect. In addition, the despreading process is carried out using different M-sequence codes from the ones that were used to modulate the ultrasonic wave, thereby obtaining a despread signal that has as high an SNR as if no Doppler shift were produced at all. Consequently, according to the present invention, the distance to the object and/or the orientation of the object can be estimated accurately with the Doppler shift compensated for.

In the preferred embodiment described above, an M sequence pseudo random signal is used to encode a transmitted signal. However, the ultrasonic measuring apparatus 2 of this preferred embodiment may also use a different pseudo random signal of the Barker sequence or the Golay sequence, for example. In that case, such a Barker or Golay sequence pseudo random signal has no similarity, and therefore, the codes to use in Step S5 to despread the I' and Q' components of the received signal are not obtained by rotating the phase of that Barker or Golay sequence pseudo signal that was used for transmission. Nevertheless, by calculating the product of such a Barker or Golay sequence pseudo random signal that was used for transmission and another M sequence that is shifted from it by one coding period and by inverting the sign of the product, codes for use to despread the I' and Q' components of the received signal can be obtained.

EXPERIMENTAL EXAMPLE

The present inventors carried out an experiment to confirm how the ultrasonic measuring apparatus 2 of this preferred embodiment can cancel the Doppler shift effect. The results will be described below.

Figure 9:
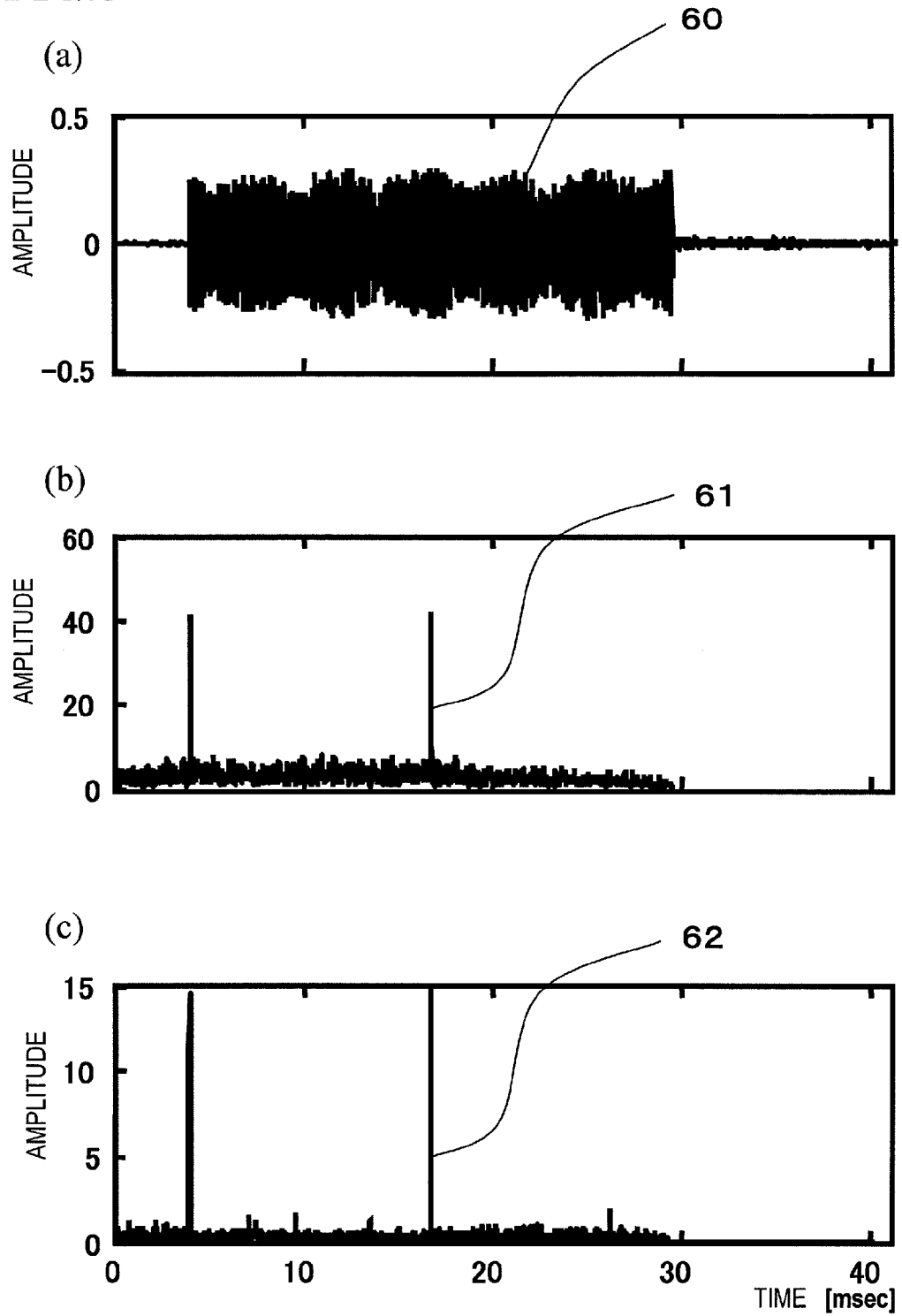
FIG. 9 shows results of experiments that were obtained by processing a received signal with the Doppler effect using the ultrasonic measuring apparatus of the present invention.

FIGS. 9(a) to 9(c) are real time waveforms showing the results of the experiments that were carried out to confirm how the ultrasonic measuring apparatus 2 of this preferred embodiment can cancel the Doppler shift effect. These results of experiments were obtained by using a ninth-order M sequence (consisting of 511 codes) at a carrier frequency of 40 kHz. Specifically, the transmitter was put on a linearly moving stage and moved at a velocity of 480 mm/s, while the receiver was fixed. The transmitted wave was a part (that was extracted for two periods) of an ultrasonic wave that was coded with the ninth-order M sequence. FIG. 9(a) illustrates a received waveform 60. The sample rate at the receiving end was set to be 160 kHz, which is four times as high as 40 kHz that is the carrier frequency at the transmitting end. Look at this received waveform 60, and it can be seen that its amplitude varied gently, which means that the phase rotated during sampling because the sample rate of the receiver that was synchronized with the carrier frequency on the transmitting end did not agree with the carrier frequency of the received signal that was actually affected by a Doppler shift.

FIG. 9(b) shows a despread signal 61 that was obtained by correcting (i.e., compressing) the M sequence to demodulate at a preset relative velocity of 480 mm/s and compensating for its Doppler shift. If its Doppler shift were perfectly canceled, a ninth-order M sequence would have an SNR of 40 dB or more. However, the results of the experiments reveal that that high SNR could not be obtained mostly due to an error of the preset velocity. As can be seen, to cancel the Doppler shift perfectly, the relative velocity must be measured accurately.

FIG. 9(c) shows a despread signal 62 that was obtained with the Doppler shift canceled by the ultrasonic measuring method of this preferred embodiment. This despread signal 62 had a higher SNR than the despread signal 61, and therefore, it can be seen that the ultrasonic measuring method of the present invention is effective.

Figure 10:
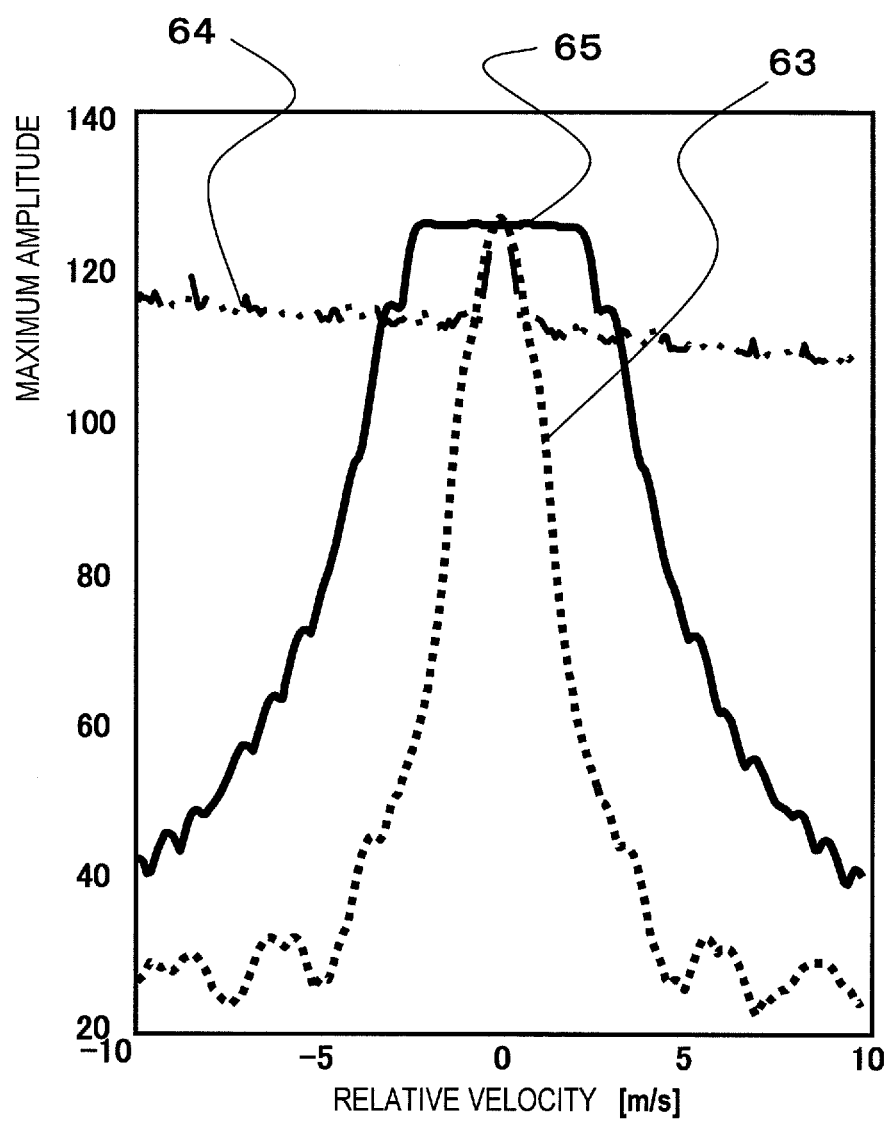
FIG. 10 shows an example of Doppler velocity dependence that was obtained by canceling the Doppler shift using the ultrasonic measuring apparatus of the present invention.
Figure 11:
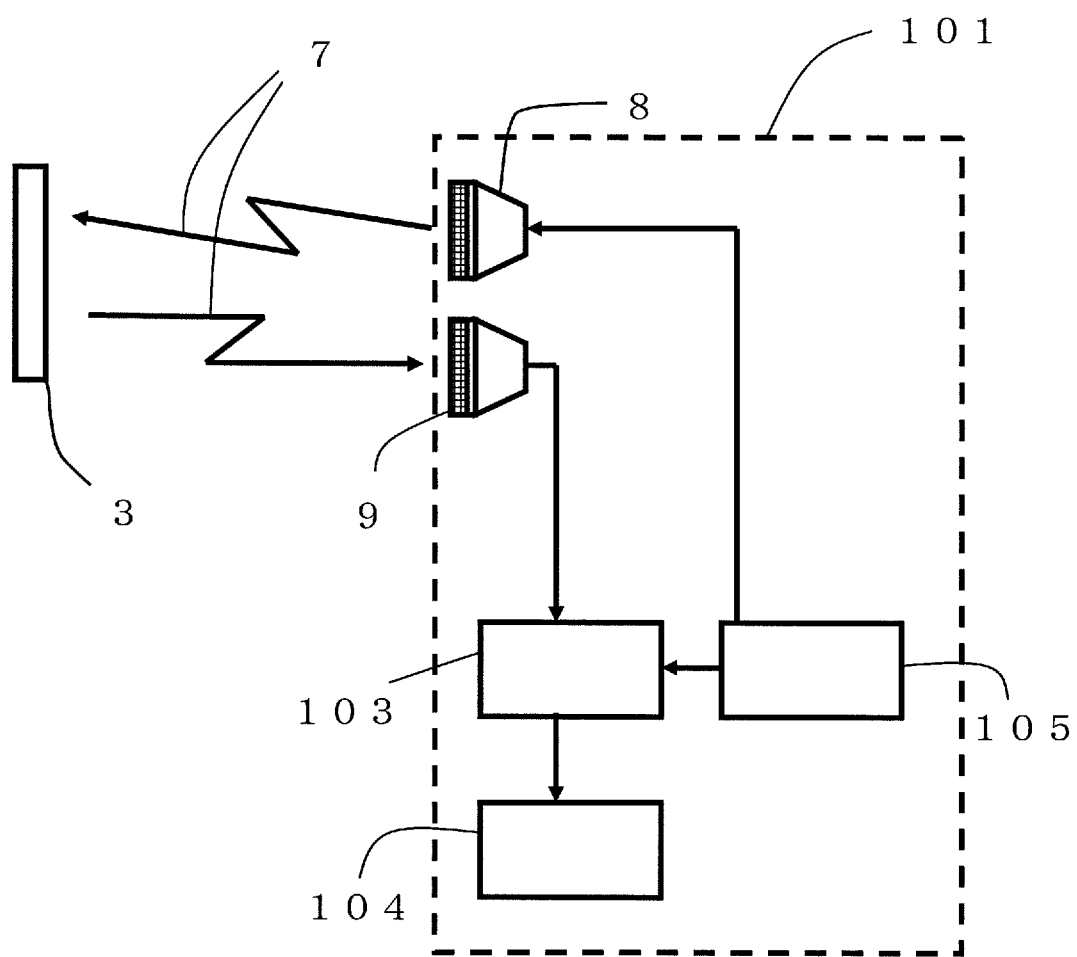
FIG. 11 illustrates a basic configuration for a conventional ultrasonic measuring apparatus.
Figure 13:
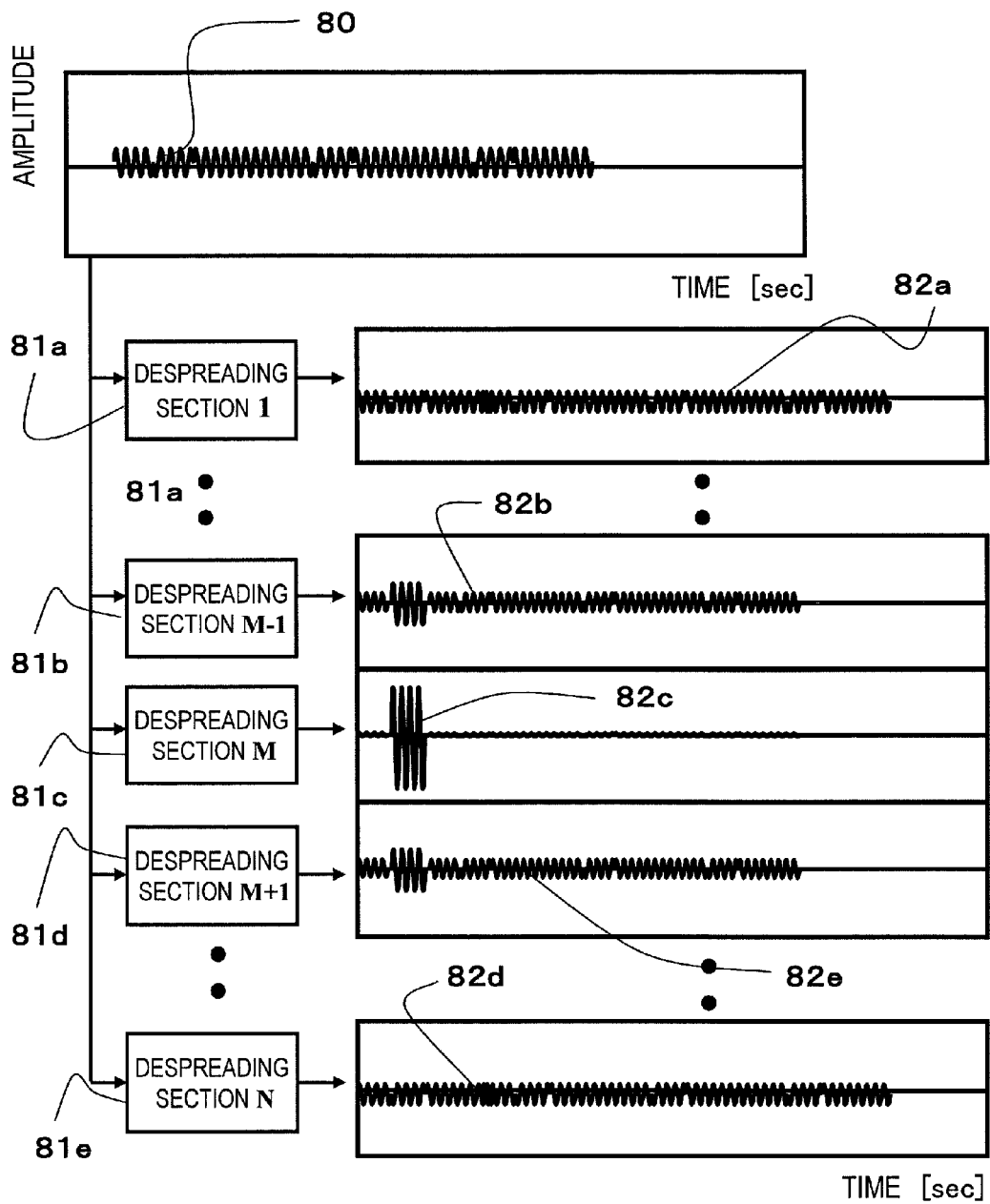
FIG. 13 illustrates the principle of a conventional Doppler shift canceling method.

FIG. 10 shows the results of experiments that were carried out to find how high the permissible relative velocity could actually be in order to cancel the Doppler shift using a seventh-order M sequence. In FIG. 10, the abscissa represents the relative velocity and the ordinate represents the peak amplitude value of the despread signal. Also, in FIG. 10, the dotted curve 63 shows how the peak amplitude value changed with the velocity if the Doppler shift was not corrected at all. As can be seen from FIG. 10, even if the relative velocity was only ±1 m/s, a steep decrease in peak amplitude value was still observed. That is to say, even if the relative velocity was low, the SNR of the received signal could decrease significantly. On the other hand, the two-dot chain curve 64 shows the results of correction that was carried out by reference to preset velocity information. In this example, relatively accurate velocity information could be collected, and therefore, good correction results were obtained over a broad range.

The solid curve 65 shows how the peak amplitude value changed with the velocity according to the ultrasonic measuring method of this preferred embodiment. When the relative velocity was within the range of ±3 m/s, the maximum amplitude value was large enough. And the variation in peak value was almost comparable to a situation where no Doppler shift was produced at all.

Generally speaking, a walking person is moving at a velocity of approximately 1.6 m/s. That is why a self-moving machine or a self-moving robot, which is supposed to be used in coordination with a human user, preferably moves more slowly than the walking person so as to avoid overwhelming him or her, and may move at a velocity of about 0.5 m/s. Supposing such a self-moving robot moved as fast as a man, a relative velocity of approximately 3.2 m/s would be produced when one self-moving robot passes a man or another self-moving robot. That is why as long as a maximum amplitude value falling within the range of ±3 m/s is obtained as in the results of experiments mentioned above, it can be said that the ultrasonic measuring method and apparatus of this preferred embodiment can be used sufficiently effectively in practice. Consequently, according to the preferred embodiment of the present invention described above, an ultrasonic wave can be detected at a high SNR even without calculating the relative velocity and sufficient effects can be achieved by such a simple method that does not use velocity information.

According to the ultrasonic measuring apparatus and method of the present invention, if a relative velocity is produced between the apparatus and an object or between its transmitter and receiver, the Doppler shift can be compensated for and the distance and the orientation can be estimated highly accurately even without using velocity information. Thus, the present invention can be used effectively as a rangefinder or a gyrosensor to be built in a self-moving robot. For example, the present invention is applicable to a transport robot that is designed to operate indoors in a railway station or an airport.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. An ultrasonic measuring method that uses a coded spread spectrum ultrasonic signal, which has a predetermined carrier frequency and which has been modulated with codes that have a coding period synchronized with the carrier frequency, to estimate at least one of the propagation distance and propagation orientation of the coded spread spectrum ultrasonic signal, the method comprising the steps of:

(A) receiving the coded spread spectrum ultrasonic signal in at least two receivers, and generating at least two received signals;

(B) performing an quadrature detection on the at least two received signals using the carrier frequency, and producing I and Q components of the received signals;

(C) performing phase difference processing on the I and Q components of the received signals with a coding period that is synchronized with the period of the carrier frequency, and obtaining I' and Q' components from which a phase shift caused by a Doppler shift has been canceled;

(D) despreading the I' and Q' components of the received signals using different codes from the codes at time intervals that are synchronized with the carrier frequency, and obtaining despread I" and Q" components;

(E) obtaining information about the amplitudes and phases of the respective received signals by carrying out computations on the I" and Q" components of the received signals; and (F) calculating at least one of the propagation distance and propagation orientation of the ultrasonic wave based on the information about the amplitudes and phases that has been obtained from the respective received signals.

2. The ultrasonic measuring method of claim 1, wherein two statuses in which the carrier frequency has phase angles of 0 and 180 degrees, respectively, are allocated to the codes.

3. The ultrasonic measuring method of claim 1, wherein the step (C) of performing the phase difference processing satisfies $$I'(t)=I(t)I(t-\tau_0)+Q(t)Q(t-\tau_0)$$

$$Q'(t)=I(t)Q(t-\tau_0)-Q(t)I(t-\tau_0)$$

where $\tau_0$ represents the coding period during transmission.

4. The ultrasonic measuring method of claim 1, wherein the codes are an M-sequence pseudo random signal.

5. The ultrasonic measuring method of claim 4, wherein the different codes for use in the step (D) are an M-sequence pseudo random signal obtained by rotating the phase of the codes.

6. An ultrasonic measuring apparatus that uses a coded spread spectrum ultrasonic signal, which has a predetermined carrier frequency and which has been modulated with codes that have a coding period synchronized with the carrier frequency, to estimate at least one of the propagation distance and propagation orientation of the coded spread spectrum ultrasonic signal, the apparatus comprising:

a receiving section for receiving the coded spread spectrum ultrasonic signal in at least two receivers, and generating at least two received signals;

an quadrature detection section for performing an quadrature detection on the at least two received signals using the carrier frequency, and producing I and Q components of the received signals;

a vector operation section for performing phase difference processing on the I and Q components of the received signals with a coding period that is synchronized with the period of the carrier frequency, and obtaining I' and Q' components from which a phase shift caused by a Doppler shift has been canceled;

a despreading section for despreading the I' and Q' components of the received signals using different codes from the codes at time intervals that are synchronized with the carrier frequency, and obtaining despread I'' and Q'' components;

a demodulating section for obtaining information about the amplitudes and phases of the respective received signals by carrying out computations on the I'' and Q'' components of the received signals; and a distance/orientation calculating section for calculating at least one of the propagation distance and propagation orientation of the ultrasonic wave based on the information about the amplitudes and phases that has been obtained from the respective received signals.

7. The ultrasonic measuring apparatus of claim 6, wherein two statuses in which the carrier frequency has phase angles of 0 and 180 degrees, respectively, are allocated to the codes.

8. The ultrasonic measuring apparatus of claim 6, wherein the vector operation section performs the processing so as to satisfy $$I'(t)=I(t)I(t-\tau_0)+Q(t)Q(t-\tau_0)$$

$$Q'(t)=I(t)Q(t-\tau_0)-Q(t)I(t-\tau_0)$$

where $\tau_0$ represents the coding period during transmission.

9. The ultrasonic measuring apparatus of claim 6, wherein the codes are an M-sequence pseudo random signal.

10. The ultrasonic measuring apparatus of claim 9, wherein the different codes are an M-sequence pseudo random signal obtained by rotating the phase of the codes.

\* \* \* \* \*